(12) United States Patent
Arakawa et al.

(10) Patent No.: US 6,243,732 B1
(45) Date of Patent: Jun. 5, 2001

(54) DATA PROCESSOR AND DATA PROCESSING SYSTEM

(75) Inventors: Fumio Arakawa, Kodaira; Norio Nakagawa, Tokyo; Tetsuya Yamada; Yonetaro Totsuka, both of Kokubunji, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/479,075

(22) Filed: Jan. 7, 2000

Related U.S. Application Data

(63) Continuation of application No. 08/950,664, filed on Oct. 15, 1997, now Pat. No. 6,038,582.

(30) Foreign Application Priority Data

Oct. 16, 1996 (JP) .................................... 8-273432

(51) Int. Cl.[7] ............................... G06F 7/32; G06F 7/38; G06F 7/42
(52) U.S. Cl. ................... 708/520; 708/501; 708/505; 708/507
(58) Field of Search .................... 708/501, 507, 708/505, 510, 514, 520, 524, 490, 495

(56) References Cited

U.S. PATENT DOCUMENTS

| | | | |
|---|---|---|---|
| 4,969,118 | 11/1990 | Montoye et al. | 364/748.07 |
| 5,359,548 | 10/1994 | Yoshizawa et al. | 364/748.11 |
| 5,757,686 | 5/1998 | Naffziger et al. | 364/748.07 |
| 5,859,997 | * | 1/1999 | Peleg et al. | 708/490 |
| 5,983,256 | * | 11/1999 | Peleg et al. | 708/523 |
| 6,035,316 | * | 3/2000 | Peleg et al. | 708/523 |

FOREIGN PATENT DOCUMENTS

| | | |
|---|---|---|
| 643734 | 1/1989 | (JP) . |
| 5150944 | 6/1993 | (JP) . |
| 521665 | 8/1993 | (JP) . |
| 5233228 | 9/1993 | (JP) . |

OTHER PUBLICATIONS

Microprocessor Report, vol. 8, No. 15, Nov. 14, 1994, pp. 6–9.
Nikkei Electronic, Jan. 15, 1996, (No. 653), pp 16–17.
Technical Report of IEICE, ICD94–135, DSP 94–91 (1994–10), pp. 73–79.

* cited by examiner

Primary Examiner—Tan V. Mai
(74) Attorney, Agent, or Firm—Antonelli, Terry, Stout & Kraus, LLP

(57) ABSTRACT

A data processor includes an arithmetic portion incorporated in a floating point unit, in which the arithmetic portion includes a plurality of multipliers supplied mantissa part of floating point number from respectively different data input signal line group and performing mutual multiplication of supplied mantissa parts, an aligner receiving outputs of respective multipliers and performing alignment shift, an exponent processing portion for generating number of alignment shift of the aligner and an exponent before normalization on the basis of generation an exponent part of the floating point number, a multi-input adder and the exponent before normalization, reducing scale of the circuit and performing inner product operation and the like with the floating point numbers in high speed and high accuracy.

9 Claims, 24 Drawing Sheets

SIXTEEN SINGLE PRECISION REGISTERS,
EIGHT DOUBLE PRECISION REGISTERS OR
FOUR VECTOR REGISTERS

ARITHMETIC BLOCK OF FLOATING POINT UNIT

FIG. 5 MAXIMUM EXPONENT SELECTING PORTION OF ARITHMETIC BLOCK
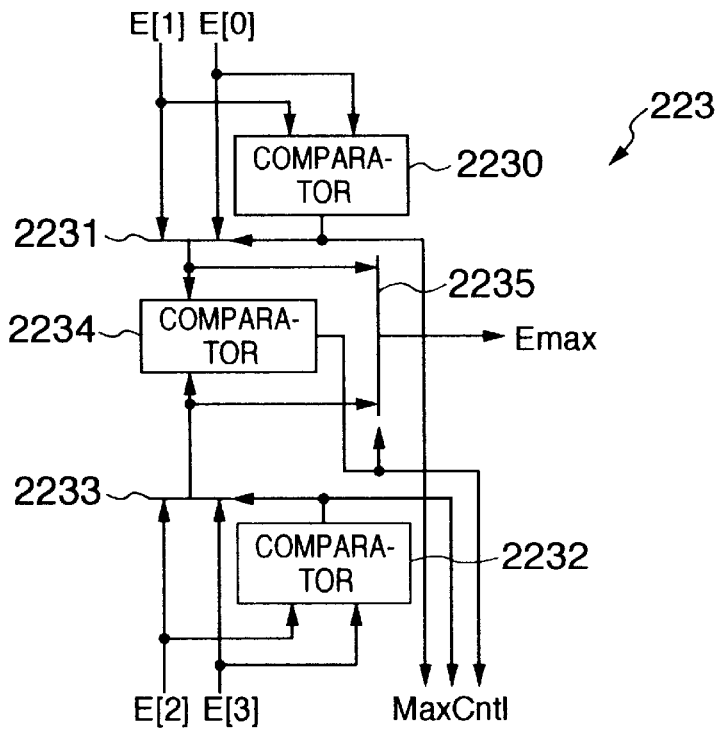
FIG. 6 SIGN SELECTING PORTION OF ARITHMETIC BLOCK
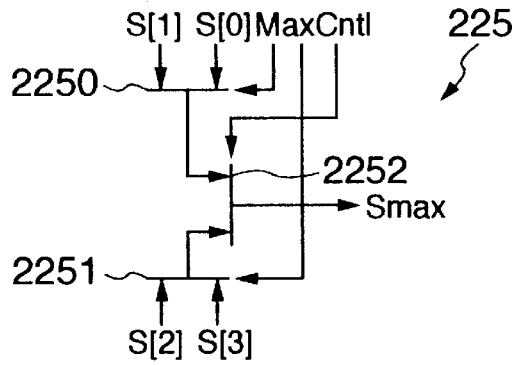
FIG. 7 ALIGNER OF ARITHMETIC BLOCK
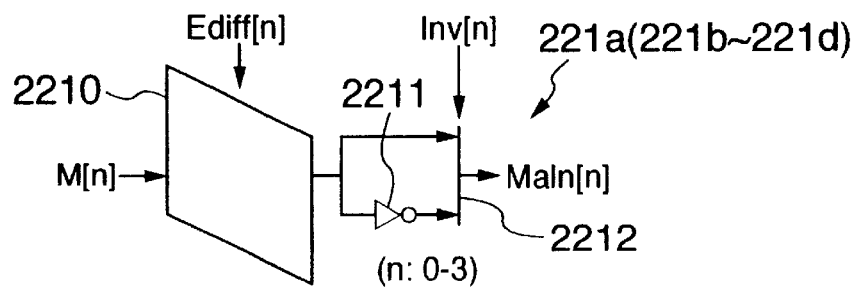

FOUR INPUT ADDERS OF ARITHMETIC BLOCK

CARRY INPUT TRANSFORMING LOGIC

| Inv [0] | [1] | [2] | [3] | Cin [0] | [1] | [2] |
|---|---|---|---|---|---|---|
| 0 | 0 | 0 | 0 | 0 | 0 | 0 |
| 0 | 0 | 0 | 1 | 0 | 0 | 1 |
| 0 | 0 | 1 | 0 | 0 | 0 | 1 |
| 0 | 1 | 0 | 0 | 0 | 1 | 0 |
| 1 | 0 | 0 | 0 | 0 | 1 | 0 |
| 0 | 0 | 1 | 1 | 1 | 0 | 1 |
| 0 | 1 | 0 | 1 | 0 | 1 | 1 |
| 0 | 1 | 1 | 0 | 0 | 1 | 1 |
| 1 | 0 | 0 | 1 | 0 | 1 | 1 |
| 1 | 0 | 1 | 0 | 0 | 1 | 1 |
| 1 | 1 | 0 | 0 | 1 | 1 | 0 |
| 0 | 1 | 1 | 1 | 1 | 1 | 1 |
| 1 | 0 | 1 | 1 | 1 | 1 | 1 |
| 1 | 1 | 0 | 1 | 1 | 1 | 1 |
| 1 | 1 | 1 | 0 | 1 | 1 | 1 |
| 1 | 1 | 1 | 1 | NOT OCCUR | | |

EACH REGISTER GROUP IN REGISTER FILE

EIGHT-READ ONE-WRITE REGISTER FILE
OF FLOATING POINT UNIT

EACH REGISTER CIRCUIT IN REGISTER GROUP

FR [n](n:0-15)

READ OPERATION A OF REGISTER FILE

| ReadType | Bank | ReadA | A [0] | A [1] | A [2] | A [3] |
|---|---|---|---|---|---|---|
| 0 | 0 | 0 | FRJ [0] | FRJ [1] | FRJ [2] | FRJ [3] |
| | | 1 | FRJ [4] | FRJ [5] | FRJ [6] | FRJ [7] |
| | | 2 | FRJ [8] | FRJ [9] | FRJ [10] | FRJ [11] |
| | | 3 | FRJ [12] | FRJ [13] | FRJ [14] | FRJ [15] |
| | 1 | 0 | FRK [0] | FRK [1] | FRK [2] | FRK [3] |
| | | 1 | FRK [4] | FRK [5] | FRK [6] | FRK [7] |
| | | 2 | FRK [8] | FRK [9] | FRK [10] | FRK [11] |
| | | 3 | FRK [12] | FRK [13] | FRK [14] | FRK [15] |
| 1 | 0 | 0 | FRK [0] | FRK [4] | FRK [8] | FRK [12] |
| | | 1 | FRK [1] | FRK [5] | FRK [9] | FRK [13] |
| | | 2 | FRK [2] | FRK [6] | FRK [10] | FRK [14] |
| | | 3 | FRK [3] | FRK [7] | FRK [11] | FRK [15] |
| | 1 | 0 | FRJ [0] | FRJ [4] | FRJ [8] | FRJ [12] |
| | | 1 | FRJ [1] | FRJ [5] | FRJ [9] | FRJ [13] |
| | | 2 | FRJ [2] | FRJ [6] | FRJ [10] | FRJ [14] |
| | | 3 | FRJ [3] | FRJ [7] | FRJ [11] | FRJ [15] |

FIG. 16
READ OPERATION B OF REGISTER FILE

| Bank | ReadB | B [0] | B [1] | B [2] | B [3] |
|---|---|---|---|---|---|
| 0 | 0 | FRJ [0] | FRJ [1] | FRJ [2] | FRJ [3] |
| | 1 | FRJ [4] | FRJ [5] | FRJ [6] | FRJ [7] |
| | 2 | FRJ [8] | FRJ [9] | FRJ [10] | FRJ [11] |
| | 3 | FRJ [12] | FRJ [13] | FRJ [14] | FRJ [15] |
| 1 | 0 | FRK [0] | FRK [1] | FRK [2] | FRK [3] |
| | 1 | FRK [4] | FRK [5] | FRK [6] | FRK [7] |
| | 2 | FRK [8] | FRK [9] | FRK [10] | FRK [11] |
| | 3 | FRK [12] | FRK [13] | FRK [14] | FRK [15] |

FIG. 17
READ OPERATION C OF REGISTER FILE

| Bank | ReadB \ ReadC | 0 | 1 | 2 | 3 |
|---|---|---|---|---|---|
| 0 | 0 | FRJ [0] | FRJ [1] | FRJ [2] | FRJ [3] |
| | 1 | FRJ [4] | FRJ [5] | FRJ [6] | FRJ [7] |
| | 2 | FRJ [8] | FRJ [9] | FRJ [10] | FRJ [11] |
| | 3 | FRJ [12] | FRJ [13] | FRJ [14] | FRJ [15] |
| 1 | 0 | FRK [0] | FRK [1] | FRK [2] | FRK [3] |
| | 1 | FRK [4] | FRK [5] | FRK [6] | FRK [7] |
| | 2 | FRK [8] | FRK [9] | FRK [10] | FRK [11] |
| | 3 | FRK [12] | FRK [13] | FRK [14] | FRK [15] |

FIG.18
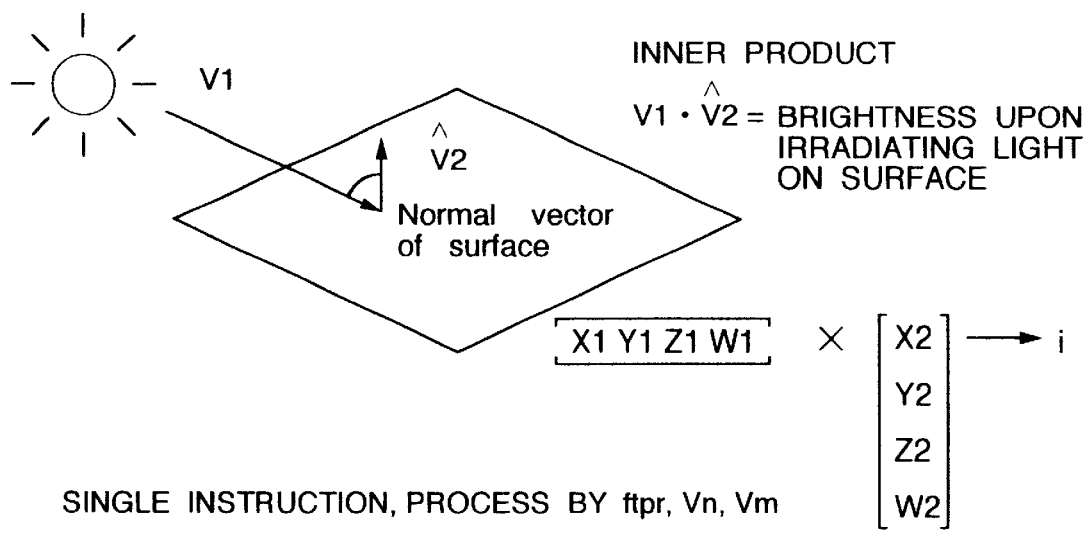
INNER PRODUCT
$V1 \cdot \hat{V2}$ = BRIGHTNESS UPON IRRADIATING LIGHT ON SURFACE
SINGLE INSTRUCTION, PROCESS BY ftpr, Vn, Vm
FIG.19
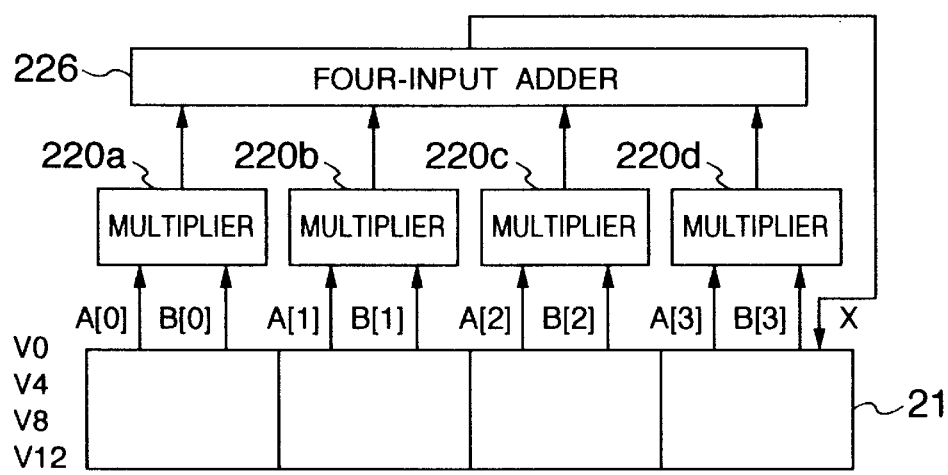
FIG.20
INNER PRODUCT COMMAND SPECIFICATION
$FR[n+3] = (v[m], V[n])$
$V[n] = \begin{pmatrix} FR[n] \\ FR[n+1] \\ FR[n+2] \\ FR[n+3] \end{pmatrix}$ (n : 0, 4, 8, 12)
$FR[n] = \begin{cases} \text{IN CASE OF FRJ}[n] \text{ BANK} = 0 \\ \text{IN CASE OF FRK}[n] \text{ BANK} = 1 \end{cases}$

FIG.21

$$A \times p_i \to p'_i$$

$$\begin{bmatrix} a11 & a12 & a13 & a14 \\ a21 & a22 & a23 & a24 \\ a31 & a32 & a33 & a34 \\ a41 & a42 & a43 & a44 \end{bmatrix} \times \begin{bmatrix} Xi \\ Yi \\ Zi \\ Wi \end{bmatrix} \to \begin{bmatrix} X'i \\ Y'i \\ Z'i \\ W'i \end{bmatrix} \text{, for I = 1 ,n}$$

SINGLE INSTURCTION, PROCESS BY SINGLE PRECISION
FLOATING POINT WITH ftrv, back, Vn

FIG.22

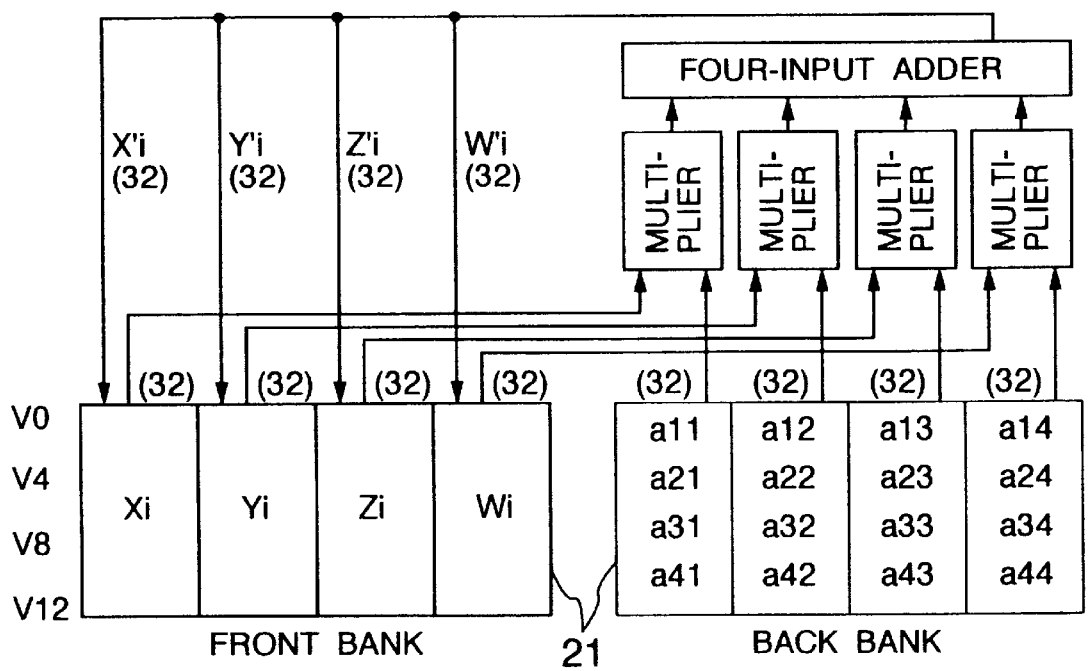

FIG.23

VECTOR TRANSFORMING COMMAND SPECIFICATION

V [n] = Matrix × V [n]

$$\text{Matrix} = \begin{pmatrix} FB[0] & FB[4] & FB[8] & FB[12] \\ FB[1] & FB[5] & FB[9] & FB[13] \\ FB[2] & FB[6] & FB[10] & FB[14] \\ FB[3] & FB[7] & FB[11] & FB[15] \end{pmatrix}$$

FB [n] = { IN CASE OF FRK [n] BANK = 0
         { IN CASE OF FRJ [n] BANK = 1

FIG.24
VECTOR TRANSFORMING COMMAND PROCESSING PIPELINE

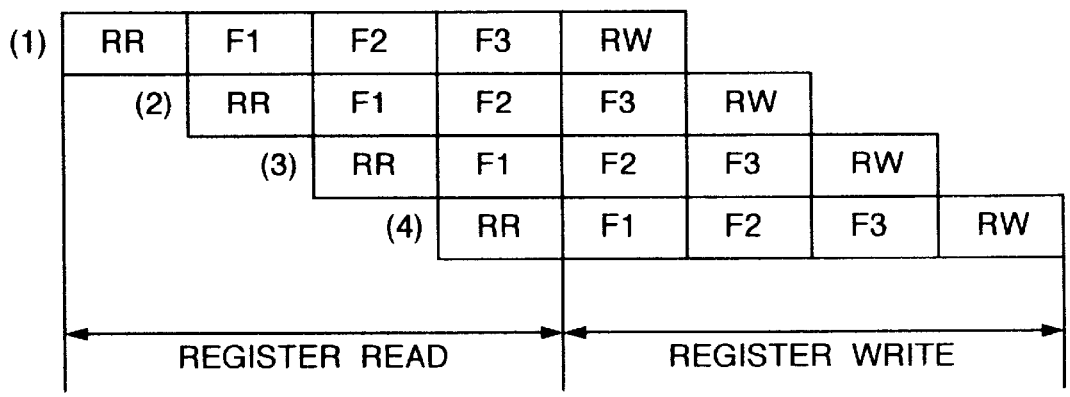

(1) FR [n]   = ( FB [0] FB [4] FB [8]  FB [12] ) V [n]
(2) FR [n+1] = ( FB [1] FB [5] FB [9]  FB [13] ) V [n]
(3) FR [n+2] = ( FB [2] FB [6] FB [10] FB [14] ) V [n]
(4) FR [n+3] = ( FB [3] FB [7] FB [11] FB [15] ) V [n]

$$\begin{pmatrix} \text{RR: REGISTER READ STAGE} \\ \text{F1: FIRST ARITHMETIC STAGE} \\ \text{F2: SECOND ARITHMETIC STAGE} \\ \text{F3: THIRD ARITHMETIC STAGE} \\ \text{RW: REGISTER WRITE STAGE} \end{pmatrix}$$

FIG.25
SINE COSINE COMMAND SPECIFICATON

FR [n] = sin FR [0]
FR [n+1] = cos FR [0]

FIG.26
ANGLE FORMAT OF SINE COSINE COMMAND

DECIMAL POINT

NUMBER OF ROTATION IS EXPRESSED BY 16 BITS BELOW DECIMAL POINT OF 32 BITS FIXED DECIMAL POINT NUMBER

FIG.27

CENTER VALUE OF SERIES EXPANSION CORRESPONDING TO VALUE OF UPPER 5 BITS IN LOWER 14 BITS OF ANGLE INPUT

| ANGLE INPUT | CENTER VALUE OF SERIES EXPANSION | | ANGLE INPUT | | CENTER VALUE OF SERIES EXPANSION | ANGLE INPUT | |
|---|---|---|---|---|---|---|---|
| | INTERNAL EXPRESSION | RADIAN | INTERNAL EXPRESSION | RADIAN | | INTERNAL EXPRESSION | RADIAN |
| 1 1 1 1 1 | 0.000000 | 0 | 0.001000 | $\pi/4$ | 1 1 1 1 1 1 0 0 0 0 | | |
| 0 0 0 0 0 | | | | | 1 0 0 0 0 0 0 1 | | |
| 0 0 0 0 1 | 0.000001 | $\pi/32$ | 0.001001 | $9\pi/32$ | 1 0 0 0 1 | | |
| 0 0 0 1 0 | | | | | 1 0 0 1 0 | | |
| 0 0 0 1 1 | 0.000010 | $\pi/16$ | 0.001010 | $5\pi/16$ | 1 0 0 1 1 | | |
| 0 0 1 0 0 | | | | | 1 0 1 0 0 | | |
| 0 0 1 0 1 | 0.000011 | $3\pi/32$ | 0.001011 | $11\pi/32$ | 1 0 1 0 1 | | |
| 0 0 1 1 0 | | | | | 1 0 1 1 0 | | |
| 0 0 1 1 1 | 0.000100 | $\pi/8$ | 0.001100 | $3\pi/8$ | 1 0 1 1 1 | | |
| 0 1 0 0 0 | | | | | 1 1 0 0 0 | | |
| 0 1 0 0 1 | 0.000101 | $5\pi/32$ | 0.001101 | $13\pi/32$ | 1 1 0 0 1 | | |
| 0 1 0 1 0 | | | | | 1 1 0 1 0 | | |
| 0 1 0 1 1 | 0.000110 | $3\pi/16$ | 0.001110 | $7\pi/16$ | 1 1 0 1 1 | | |
| 0 1 1 0 0 | | | | | 1 1 1 0 0 | | |
| 0 1 1 0 1 | 0.000111 | $7\pi/32$ | 0.001111 | $15\pi/32$ | 1 1 1 0 1 | | |
| 0 1 1 1 0 | | | | | 1 1 1 1 0 | | |

FIG.28

PROCESSING FOLW OF SINE COSINE COMMAND x IS A VALUE DERIVED BY COUNTING OVER ONE AS ONE AND DISREGARDING REST OF THE LEAST SIGNIFICANT BIT OF 7 BITS BELOW DECIMAL POINT OF FR [0]
dx IS A VALUE DERIVED BY SIGN EXPANSION OF LEAST 10 BITS OF FR [0]
IN MULTIPLIERS FM0 AND FM2, ONLY BELOW DECIMAL POINT IS FED BACK AND UPPER BIT IS SET ZERO, WHEN RESULT OF ARITHMETIC OPERATION OBTAINING THE SAME EFFECT AS +1 IS USED TWICE, VALUE IS HELD BY RESTRICTING UPDATING OF INPUT LATCH OF MULTIPLIER

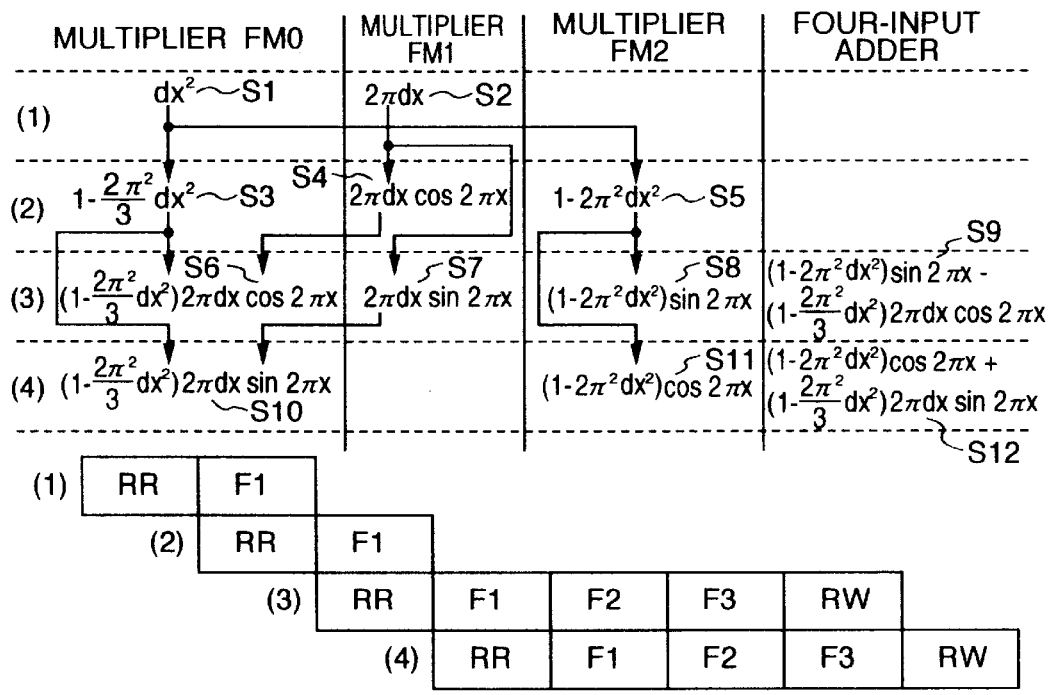

x+dx IS IN FIRST QUADRANT:
 BY POST PROCESS (NORMALIZING, OBJECTING POSITIVE NUMBER, ROUNDING)
 OF OUTPUT OF FOUR-INPUT ADDER AT STEP (3) AND STORE IN FR [n]
 BY POST PROCESS OF OUTPUT OF FOUR-INPUT ADDER AT STEP (4) AND
 STORE IN FR [n +1]
x+dx IS IN SECOND QUADRANT:
 BY SIGN REVERSAL AND POST PROCESS OF OUTPUT OF FOUR-INPUT ADDER
 AT STEP (3) AND STROE IN FR [n +1]
 BY POST PROCESS OF OUTPUT OF FOUR-INPUT ADDER AT STEP (4) AND
 STORE IN FR [n]
x+dx IS IN THIRD QUADRANT:
 BY SIGN REVERSAL AND POST PROCESS OF OUTPUT OF FOUR-INPUT ADDER
 AT STEP (3) AND STORE IN FR [n]
 BY SIGN REVERSAL AND POST PROCESS OF OUTPUT OF FOUR-INPUT ADDER
 AT STEP (4) AND STORE IN FR [n +1]
x+dx IS IN FOURTH QUADRANT:
 BY POST PROCESS OF OUTPUT OF FOUR-INPUT ADDER AT STEP (3) AND
 STORE IN FR [n+ 1]
 BY SIGN REVERSAL AND POST PROCESS OF OUTPUT OF FOUR-INPUT ADDER
 AT STEP (4) AND STORE IN FR [n]

SINGLE PRECISION MULTIPLIER FOR SINE AND COSINE

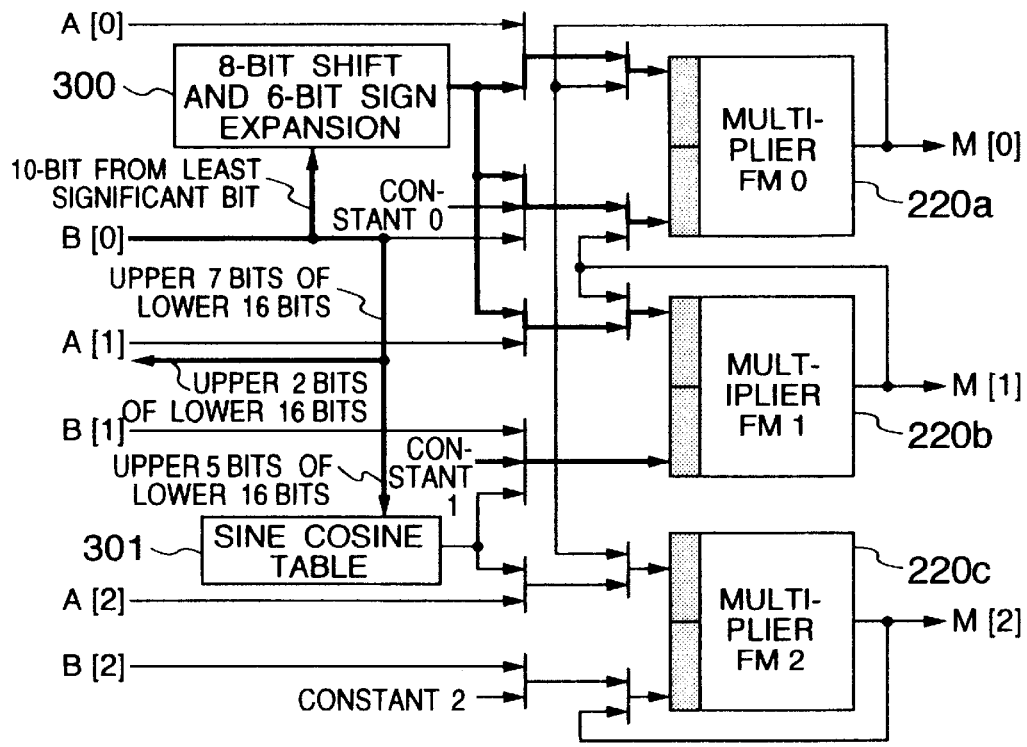
FIG. 30 FIRST STEP OPERATION OF SINGLE PRECISION MULTIPLIER FOR SINE AND COSINE
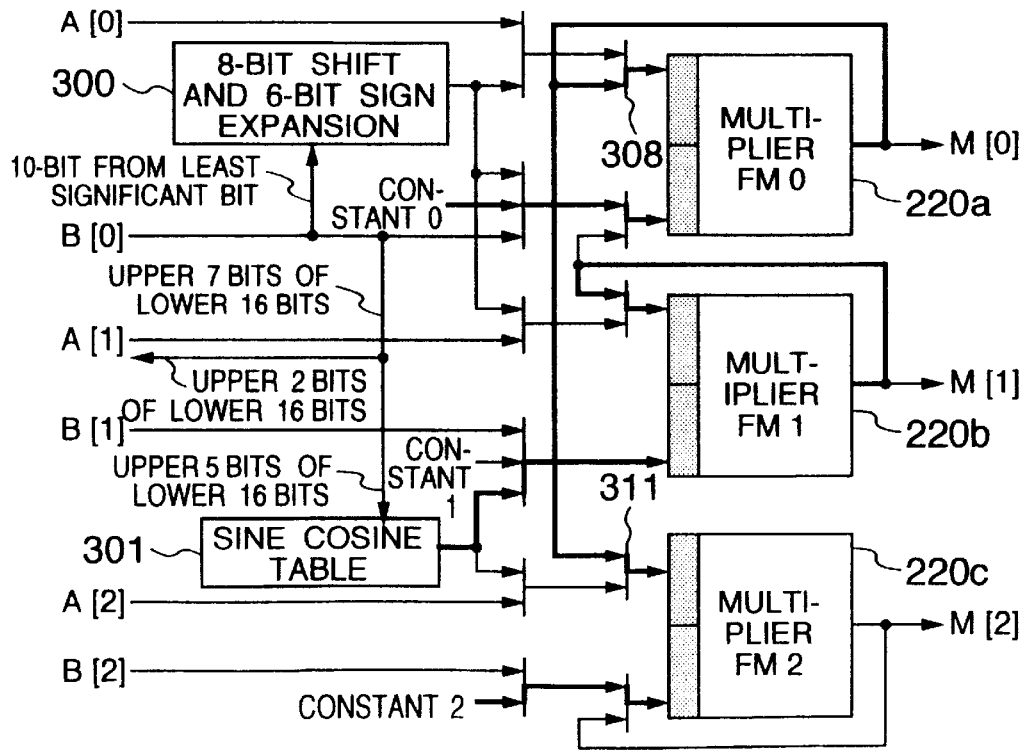
FIG. 31 SECOND STEP OPERATION OF SINGLE PRECISION MULTIPLIER FOR SINE AND COSINE

THIRD STEP OPERATION OF SINGLE PRECISION MULTIPLIER FOR SINE AND COSINE

FIG.33
FOURTH STEP OPERATION OF SINGLE PRECISION MULTIPLIER FOR SINE AND COSINE
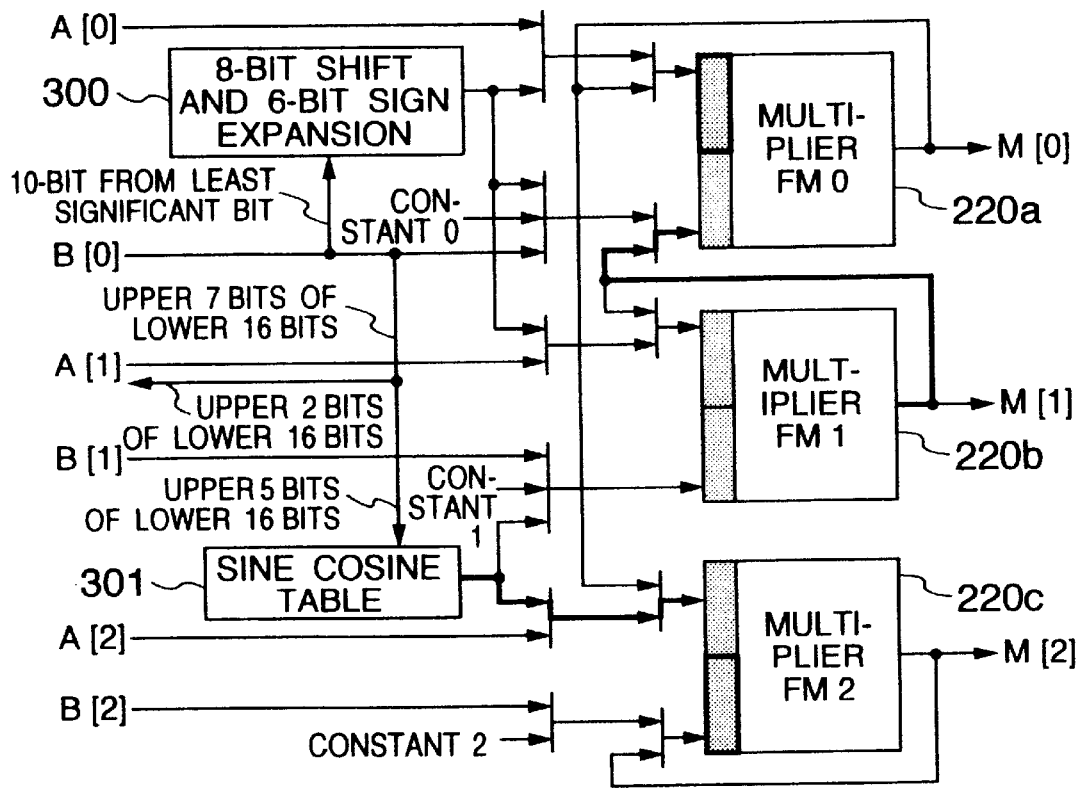
 LATCH FOR UPDATING
 LATCH FOR HOLDING VALUE OF ONE PRECEDING STEP WITHOUT UPDATING

TWO-PARALLEL FLOATING POINT MULTIPLY-ADD OPERATION

FOUR-PARALLEL FLOATING POINT MULTIPLY-ADD OPERATION

FOUR-PARALLEL INTEGER MULTIPLY-ADD OPERATION

DATA PROCESSOR AND DATA PROCESSING SYSTEM

This is a continuation of application Ser. No. 08/950,664, filed Oct. 15, 1997 U.S. Pat. No. 6,038,582.

BACKGROUND OF THE INVENTION

1. Field of the Invention

The present invention relates to a data processor specialized for inner product operation or matrix operation, and further to a data processing system optimal for three-dimensional graphics control, and relates to a technology effective as applied for a data processor for executing application frequently using floating point number vector or matrix less than or equal to length 4, for example.

In three-dimensional graphics and so forth, matrix operation employing 4×4 transform matrix for rotation, expansion, contraction, perspective projection and parallel translation and so forth of a graphic pattern may be often utilized, and inner product operation may also be utilized for determining brightness of a light receiving surface, and so forth. Repeating of multiply-add operations is necessary for such matrix operation or inner product operation. Also, in concerning data to be handled in three-dimensional graphics, floating point number has been conventionally used in a high-end system. Even in the field having severe constraint of cost, such as a game machine, handheld PC and so forth, the handling data is shifting from integer to floating point number method. This is because that floating point number facilitates programming and is adapted to higher level process.

2. Description of the Related Art

A multiply-add unit is designed to perform operation of (A×B)+C as single function. For example, "PA-8000 Combines Complexity and Speed", Microprocessor Report, Vol 8, No. 15, Nov. 14, 1994, pages 6 to 9, there has been disclosed a processor employing the multiply-add unit, in which parallelism of the multiply-add unit has been 2.

In "Nikkei Electronics" (Nikkei PB K.K.) No. 653, Jan. 15, 1996, pages 16 to 17, there has been disclosed a semiconductor integrated circuit, in which three-dimensional drawing function is integrated on one chip. In the disclosed semiconductor integrated circuit, a multiply-add unit performing operation of eight fixed point number data in one cycle, has been incorporated thereinto. Also, there is a disclosure that transformation of coordinates utilizing 4×4 matrix can be processed in two cycles.

On the other hand, JP-A-64-3734 discloses a multiplier circuit constituted of four multipliers and an adder summing the outputs of four multipliers with matching digits. Since the multiplier circuit is adapted to process multiplication of basic word length and double word length. Therefore, digit matching function is simply specialized for this process and thus, inner product operation of floating point number cannot be performed.

In JP-A-5-150944, a digital signal processor having a plurality of multiply-add units and means for connecting therebetween has been disclosed. The digital signal processor is adapted for integer.

Also, JP-A-5-216657 discloses a high speed processor for digital signal processing. There is a disclosure for geometry process employing a multiply-add unit for floating point number by the high speed processor.

On the other hand, JP-A-5-233228 discloses a floating point arithmetic unit and operation method thereof. There is a disclosure of means for reducing size of a floating point unit. However, since the disclosed system makes a multiplying array into half to use twice, the performance becomes half. Since components other than multiplying array are not reduced the sizes, an area-to-performance ratio of the floating point unit is lowered.

All of the above set forth have not considered speeding up of 4×4 matrix operation or inner product operation, at all.

SUMMARY OF THE INVENTION

The inventor has studied for speeding up of matrix operation and inner product operation employing floating point number. According to this, it has been found that since a multiply-add unit of floating point number has large circuit scale, if they are simply arranged in parallel, increasing of the circuit scale becomes significant, and thus, as disclosed in the first publication, "PA-8000 Combines Complexity and Speed", the possible parallelism is in the extent of two to limit speeding up. On the other hand, in the content of the disclosure of the second publication, "Nikkei Electronics", transformation of coordinates using a 4×4 matrix can be processed in two cycles to achieve speeding up in certain extent. However, for using an integer multiply-add unit having small number of bits, it is inherent to sacrifice precision of operation.

An object of the present invention is to provide a data processor which can speed up matrix operation and inner product operation employing a floating point number.

Another object of the present invention is to provide a data processor which can perform matrix operation or inner product operation employing a floating point number at high precision and high speed.

Typical one of inventions disclosed in the present application will be briefly explained as follow.

Namely, a data processor comprises an arithmetic portion incorporated in a floating point unit, including a plurality of multipliers supplied mantissa part of floating point number from respectively different data input signal line group and performing mutual multiplication of supplied mantissa parts, an aligner receiving outputs of respective multipliers and performing alignment shift, an exponent processing portion for generating number of alignment shift of the aligner and an exponent before normalization on the basis of generation an exponent part of the floating point number, a multi-input adder for adding the outputs of the aligner, and a normalizer for normalizing the output of the multi-input adder and the exponent before normalization.

By making multiplication by a plurality of multipliers and addition of the results of multiplication parallel, the data processor can speed up the inner product operation or vector transforming operation. Also, the inner product can be obtained by one parallel multiplication and addition. Also, since the inner product can be derived by multiplication and addition at once to avoid necessity of process, such as rounding, to be executed at every multiply-add operation for two inputs to shorten latency of inner product operation. Furthermore, accuracy of arithmetic operation becomes high. Also, it will not happen to differentiate the results of arithmetic operations as that happen when rounding per every multiply-add operation is repeated. Furthermore since the data processor requires one circuit for normalization and the like, increasing of the circuit scale can be restricted as much as possible while inner product operation and vector transforming operation of floating point can be performed at high speed and with high accuracy.

In order to efficiently perform process for negative number in parallel multiplication and addition of floating point number, it is preferred that the arithmetic portion further includes a sign processing portion generating a sign with respect to a result of multiplication of each multiplier in response to the sign of floating point number multiplied by each multiplier, the aligner includes a selector selectively outputting the result of alignment shift in inverting or non-inverting manner for selecting an inverted output when the sign of the result of multiplication is negative, and the multi-input adder generates a carry for adding +1 to the output of aligner corresponded to negative sign with respect to the result of multiplication to perform complement process of two for the negative result of multiplication.

The objective data for arithmetic operation by the arithmetic portion and resultant data of arithmetic operation are temporarily stored in a register file. At this time, in order to enable such process without increasing number of ports of the register and number of bits of a register designation field, the register file is provided a register bank structure so that a plurality of register banks or the registers of single bank are connected to respective input terminals of the multipliers.

Paying attention for inner product operation, it is preferred to include an inner product operation command for directly deriving the inner product of less than or equal to length 4 in the instruction set of the data processor. The floating point unit further includes a control portion which can decode floating point command defining inner product operation of data expressed by a plurality of components, the control portion decodes the floating point command to provide component of data held in the register file to the arithmetic portion via the signal line group to make the arithmetic portion to calculate the inner product of the provided data to write in the result of inner product operation in the register file.

Paying attention for matrix transforming operation, it is preferred to incorporate a vector transforming operation command in the instruction set of the data processor. The floating point unit has a control portion which can decode a floating point command defining a matrix operation of data expressed by each of a plurality of components and a transformation matrix, the control portion decodes the floating point command, reads the data component held by the register file and component of the transformation matrix to provide to the arithmetic portion via the signal line group, makes the arithmetic portion to calculate inner product of the provided data, repeatedly executes a series of operation cycle for writing the result of inner product operation in the register file for a plurality of times. At this time, for correct operation even when a source register and a destination register are overlapped, and controls latency of respective arithmetic cycles so that the reading operation of the register file in the final arithmetic cycle to be sequentially executed for a plurality of times becomes earlier than writing timing of the register file of the result of inner product operation in the first arithmetic cycle. Also, at this time, by performing reading out from the register file in both banks, in parallel, and performing register selection control for performing writing in the register file to one of the banks, shorting of number of floating point register can be compensated. Namely, the register file is used by assigning a plurality of operands (transformation matrix, vector data) to a plurality of banks, separately.

Such a manner of use of the register file is effective for an architecture, in which the register designation filed is limited such as sixteen bit fixed length floating point command, and number of registers is limited, and enables inner product operation and vector transforming operation of floating point in the data processor of the architecture having such limited resource.

On the other hand, by adding a coefficient table and a feedback circuit of the multiplier in the arithmetic portion, an approximated value of trigonometric function can be obtained by zone division and high order polynomial expansion. By this, sine and cosine to be used in the transformation matrix or so forth can be obtained without significantly increasing the chip area.

The data processor includes a CPU connected to the address bus and a data bus, and the floating point unit performs floating point processing using sixteen-bit fixed length floating point command. The CPU performs addressing process for obtaining data necessary for execution of floating point processing in the floating point unit. By this, the floating point unit does not require a support high performance addressing mode as that of CPU. Even in this point, sixteen bit fixed length of the floating point command is enabled.

BRIEF DESCRIPTION OF THE DRAWINGS

FIG. 5 is a block diagram of one embodiment of a maximum digit number selecting portion;

FIG. 6 is a block diagram of one embodiment of a matching selecting portion;

FIG. 7 is a block diagram of one embodiment of an aligner;

FIG. 16 is an explanatory illustration showing mode of operation of a read port B of the register file;

FIG. 17 is an explanatory illustration showing mode of operation of a read port C of the register file;

FIG. 18 is an explanatory illustration showing application of an inner product;

FIG. 19 is a block diagram briefly showing a process according to an inner product operation command;

FIG. 20 is an explanatory illustration showing one example of a specification for use of a register file in the inner product operation command;

FIG. 21 is an explanatory illustration generally showing a vector transformation;

FIG. 22 is a block diagram briefly showing a process according to a vector transformation command;

FIG. 23 is an explanatory illustration showing one example of specification for use of the register file in a vector transformation operation command;

FIG. 24 is an explanatory illustration showing a pipeline of a plurality of times of inner product calculation process by one vector transformation command;

FIG. 25 is an explanatory illustration of specification of a sine-cosine command;

FIG. 26 is an explanatory illustration of a format of an angle data to be used in the sine-cosine command;

FIG. 27 is an explanatory illustration showing a relationship between a center value for polynomial approximate and an angle (radian);

FIG. 28 is a flowchart of an operation process according to the sine-cosine command according to polynomial approximation;

FIG. 30 is an explanatory illustration showing flow of data in the first step shown by (1) of FIG. 28, by a thick line;

FIG. 31 is an explanatory illustration showing flow of data in the second step shown by (2) of FIG. 28, by a thick line;

FIG. 33 is an explanatory illustration showing flow of data in the second step shown by (4) of FIG. 28, by a thick line;

DESCRIPTION OF THE PREFERRED EMBODIMENT

Construction of Data Processor

Figure 1:
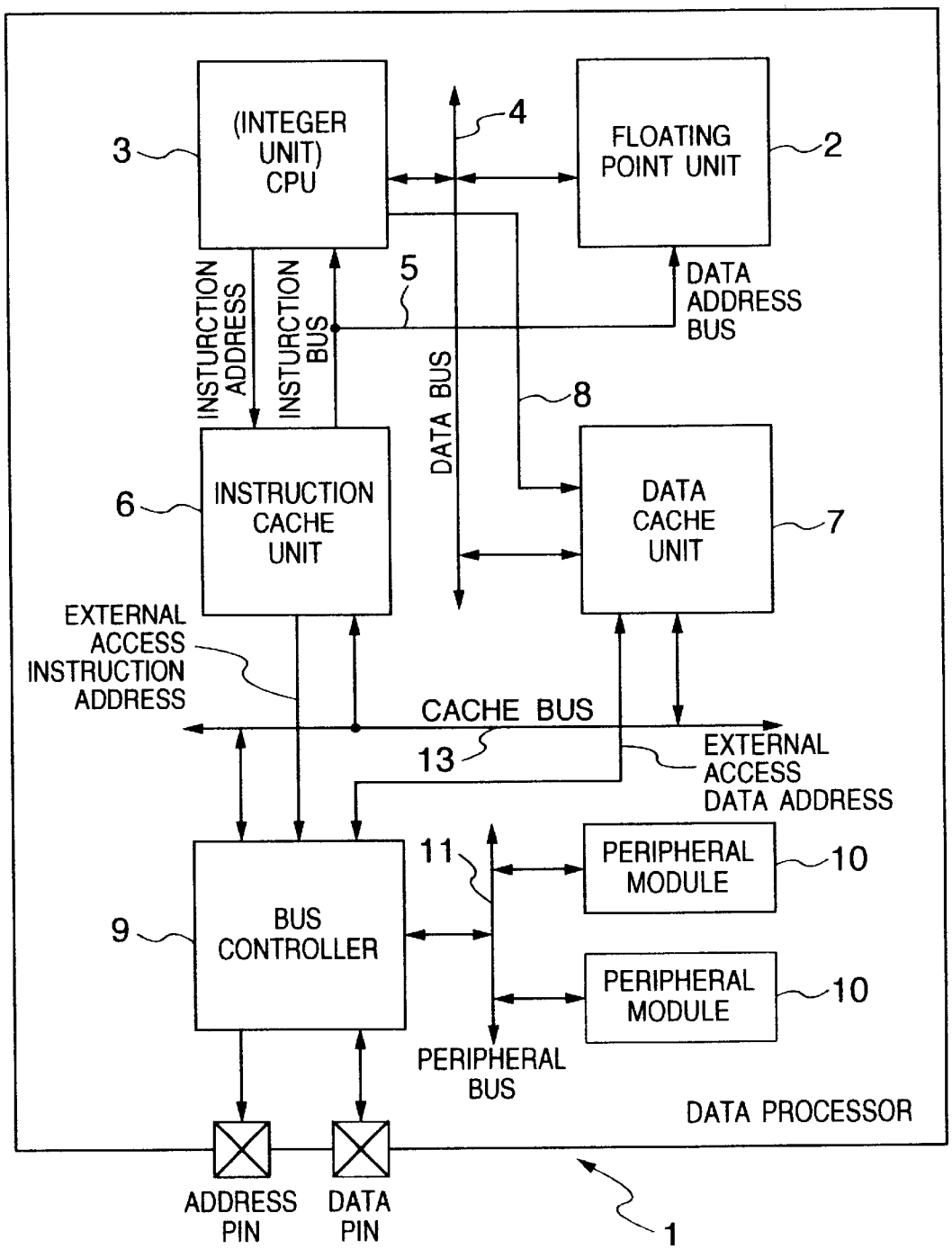
FIG. 1 is a block diagram of one embodiment of a data processor according to the present invention.

FIG. 1 is a block diagram of one embodiment of a data processor according to the present invention. The data processor 1 shown in FIG. 1 has a 32 bit RISC (Reduced Instruction Set Computer) architecture and executes fixed length 16 bit floating point command. The shown embodiment is particularly effective in application for an equipment built-in control (e.g. video game) requiring sufficient support for three-dimensional graphics.

The data processor 1 has a floating point unit 2. A floating point number for which the floating point unit performs operation, is a single precision. Also, the data processor 1 has a central processing unit (CPU) 3. This CPU 3 is an integer unit having performance for processing an integer. CPU 3 is connected to the floating point unit 2 via a 32 bit data bus 4. CPU 3 and the floating point unit 2 takes instruction from an instruction cache unit 6 via an instruction bus 5. An instruction address is provided to the instruction cache unit 6 from CPU 3. A data cache unit 7 is connected to the data bus 4 and is supplied a data address from CPU 3 via a data address bus 8. The data cache unit 7 and the instruction cache unit 6 have cache controller and cache memory respectively neglected from illustration. The instruction cache control 6 and the data cache unit 7 are connected to a bus controller via a cache bus 13 including a data signal and a control signal. An instruction address for external access caused by cache-miss or so forth in the instruction cache unit 6, is applied to a bus controller 9. A data address for external access caused by cache-miss or so forth in the data cache unit 7, is applied to the bus controller 9. According to the instruction address or the data address, the bus controller 9 initiates an external bus cycle for accessing an external memory connected to an address pin, a data pin or so forth typically illustrated. On the other hand, to the bus controller 9, a peripheral circuit 10, such as a timer, serial communication interface controller and so forth, is connected via a peripheral bus 11. The data processor shown in FIG. 1 is formed on one semiconductor substrate, such as monocrystalline silicon. The floating point unit (hereinafter simply referred to as FPU) requires data or instruction from a memory for floating point process. In the shown embodiment, the FPU 2 does not have a capability for storing data in a cache memory in the data cache unit 7 or obtaining data from the cache memory. This is for saving a chip area by avoiding necessity of memory addressing circuit of the FPU 2. Accordingly, the FPU 2 or the floating point instruction is not necessary to support a powerful addressing mode similarly to CPU 3, and all of such functions are loaded to CPU 3. CPU 3 performs not only fetching of data from the memory for the FPU 2 but also fetching of all instructions including floating point instruction for the FPU 2 from the memory. Instruction is taken both in CPU 3 and the FPU 2 and decoded therein. CPU 3 executes the integer process designated by the instruction when the decoded instruction is instruction for CPU. On the other hand, when the decoded instruction is for FPU. CPU 3 performs addressing process to be executed in place of the FPU 2. When the decoded instruction is an instruction for FPU, the FPU 2 executes the floating point process designated by the instruction. Also, when the decoded instruction is an instruction for CPU, the FPU 2 ignores the instruction.

Figure 2:
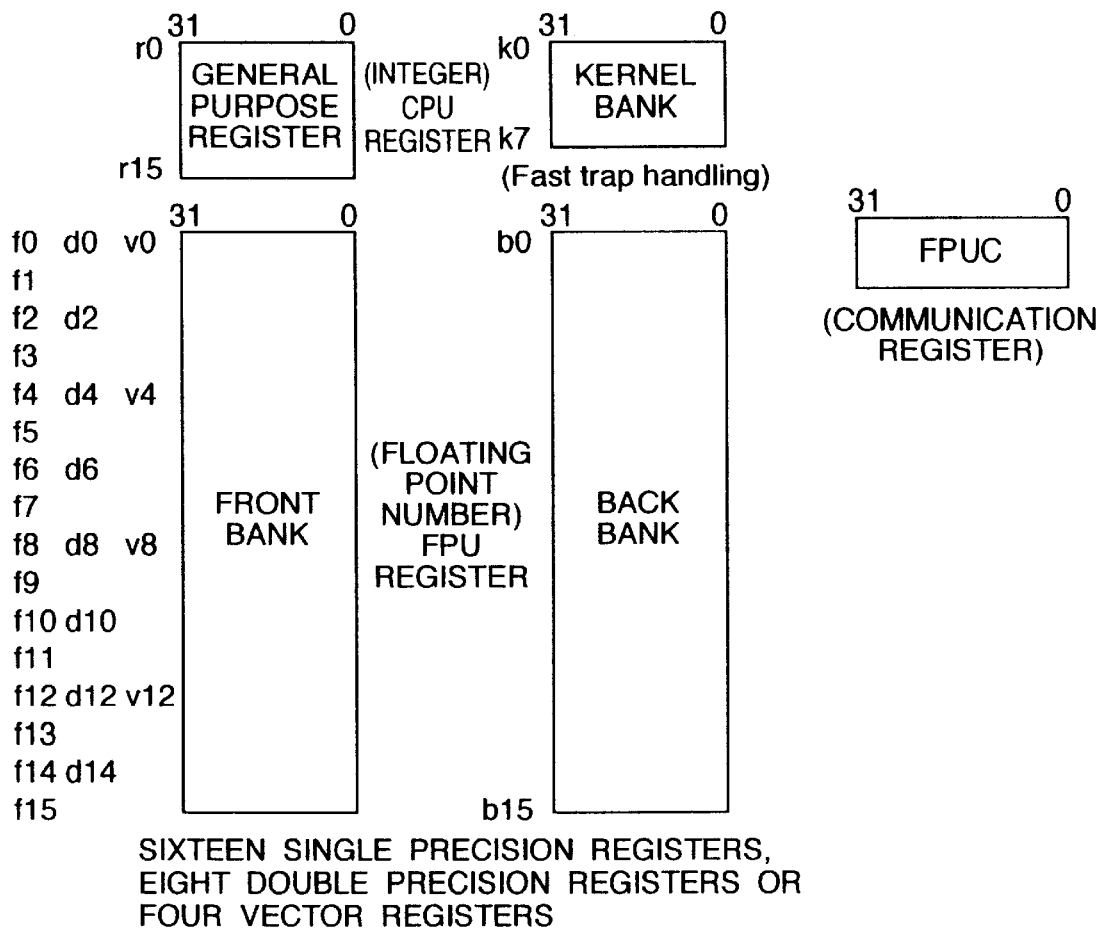
FIG. 2 is an explanatory illustration of a primary register construction of the data processor of FIG. 1.

FIG. 2 shows a major register construction of the data processor. A CPU register has sixteen general purpose registers r0 to r15 and Kernel bank registers k0 to k7 corresponding to the former. For example, Kernel bank register k0 to k7 are used by bank switching control in place of saving in the general purpose registers r0 to r7 upon occurrence of exception.

The FPU register has a bank register structure having a front-bank and a back-bank. The front-bank includes sixteen registers f0 to f15. The back-bank includes corresponding sixteen registers b0 to b15. Which bank of the registers are to be used is determined depending upon a value of a control bit of a control register, for example. In case of the FPU register, the registers in both banks are used as source registers and destination registers when a particular floating point instruction is to be executed. The registers f0 to f15 are taken as sixteen registers for the floating point number of a single precision format, as eight registers (d0, d2, d4, d8, d10, d12, and d14 for the floating point number of double precision format, and as four vector registers (V0, V4, V8 and V12) for a vector data having four components, each of which is provided in single precision format.

A communication register FPU common to the FPU 2 and CPU 3 is provided, The register FPU is provided for speeding up transfer of data between CPU 3 and the FPU 2. It should be noted that each register has 32 bit construction.

Construction of FPU

Figure 3:
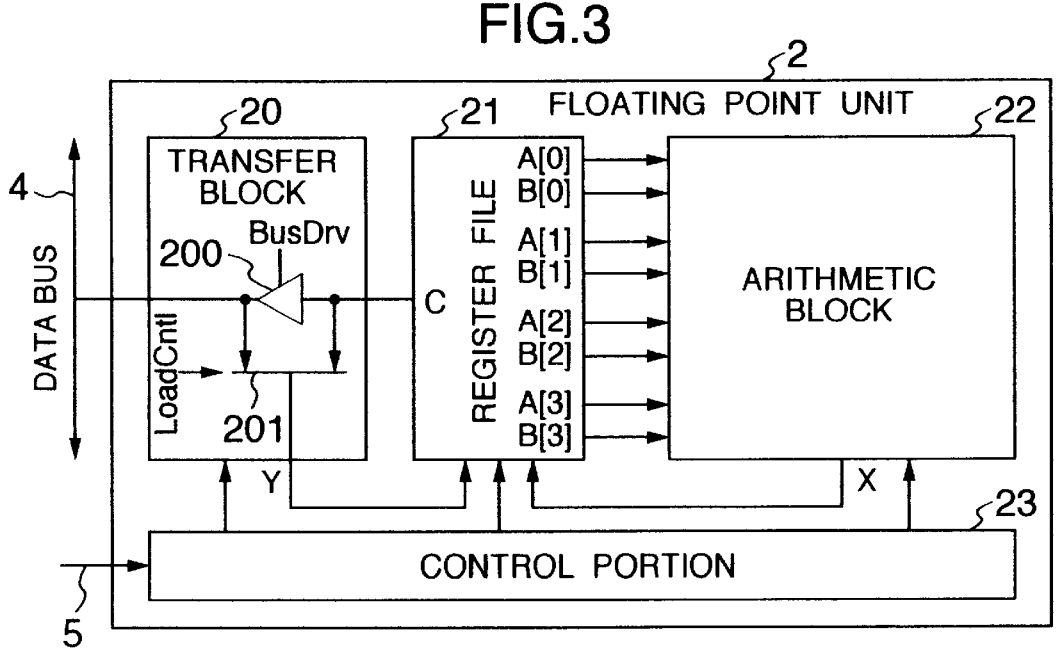
FIG. 3 is a block diagram of one embodiment of FPU.

In FIG. 3, a block diagram of the FPU 2 is illustrated. The FPU 2 is constructed with a transfer block 20, a register file 21, an arithmetic block 22 and a control portion 23. The arithmetic block 22 has a construction of a multiply-add unit realizing speeding up of matrix operation or vector operation, discussed in detail. The register file 21 includes the FPU register discussed in connection with FIG. 2, and has eight read ports A[0], B[0], A[1], B[1], A[2], B[2], A[3] and B[3] for the arithmetic block 22 and a write port X receiving data from the arithmetic block 22. The transfer block 20 includes a bus driver 200 supplying data output from each port C of the register file and a selector 201 selecting an input from the data bus 4 and an output from the register file 21 for supplying to a write port Y of the register file 21. The control portion 23 decodes the instruction supplied from the instruction bus 5, and controls the transfer block 20, the register file 21 and the arithmetic block 22 according to result of decoding. Control signals BusDrv and LoadCntl of the bus driver 200 and the selector 201 are also generated by the control portion 23.

Figure 4:
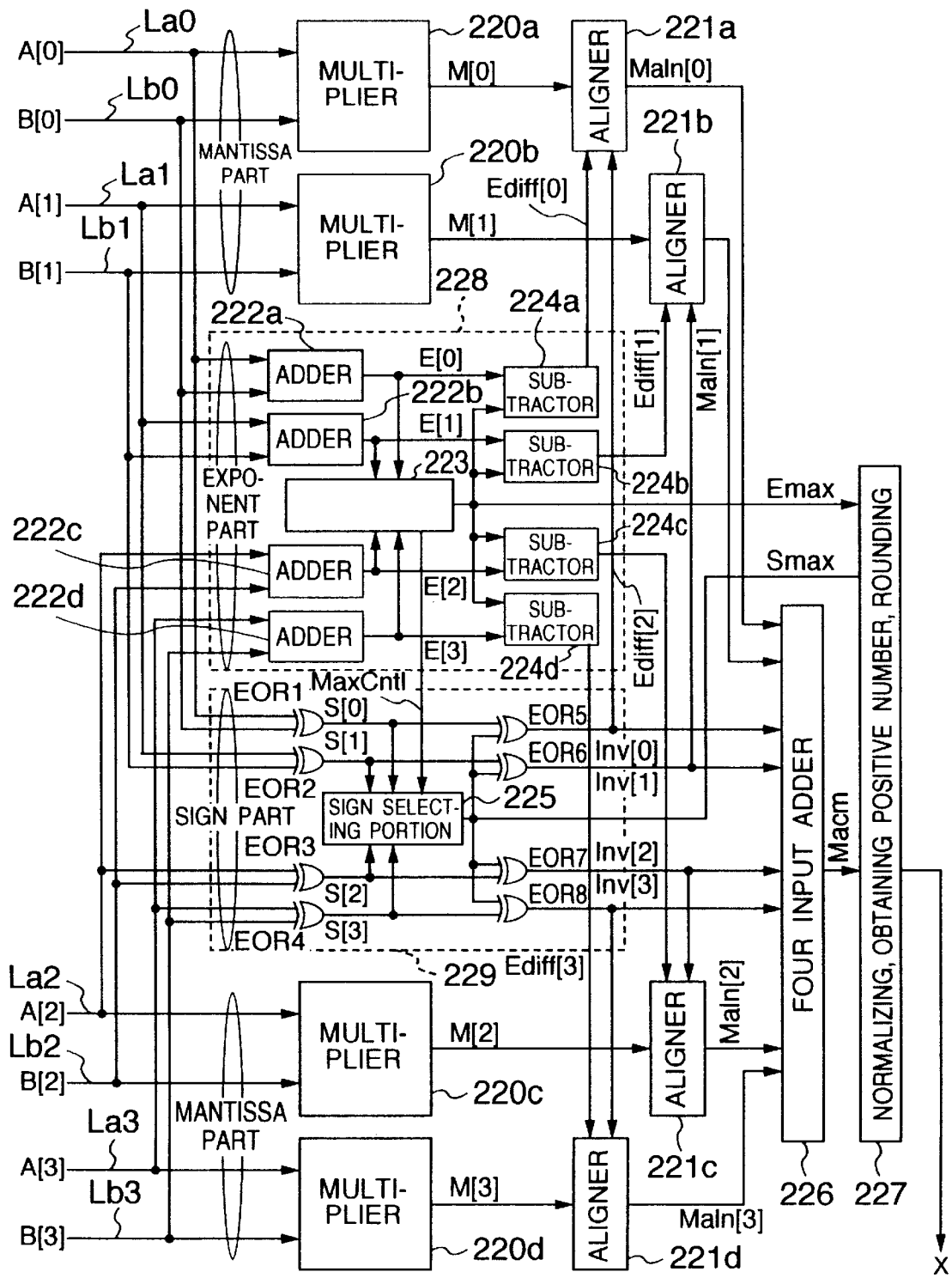
FIG. 4 is a block diagram of one embodiment of an arithmetic block.

In FIG. 4, one embodiment of the arithmetic block 22 is illustrated. The arithmetic block 22 has signal line groups La0, Lb0, La1, Lb1, La2, Lb2, La3 and Lb3 (these signal line groups will be also indicated as Lai and Lbi simply) individually connected respectively to the read ports A[0], B[0], A[1], B[1], A[2], B[2], A[3] and B[3] (these read ports are also indicated as A[n] and B[n], simply). To four multipliers 220a to 220d, mantissa part of the floating point number is supplied to multiplier factor and a multiplicand, through respective signal line groups Lai and Lbi. The multipliers 220a to 220d perform multiplication of the multiplier factor and the multiplicand supplied respectively for outputting products M[0], M[1]. M[2] and M[3] (hereinafter also indicated as M[n], simply). The products M[0], M[1]. M[2] and M[3] are supplied to corresponding aligners 221a to 221d.

An exponent part of the floating point number supplied to respective signal line groups Lai and Lbi is supplied to respective adders 222a to 222d. A sign part of the floating point number supplied to respective signal line groups Lai and Lbi is supplied to respective exclusive OR gates EOR1 to EOR4.

The adder 222a to 222d, a maximum exponent selecting portion and subtractors 224a to 224d form an exponent processing portion 228. The adders 222a to 222d add exponent parts of the floating point numbers corresponded to multiplier factors and the multiplicands to outputs sums E[0], E[1], E[2] and E[3]. The maximum exponent selecting portion 223 selects maximum one Emax of the sums E[0], E[1], E[2] and E[3] of the exponents. The subtractors 224a to 224d subtracts E[0], E[1], E[2] and E[3] from Emax to obtain difference Ediff[0], Ediff[1], Ediff[2] and Ediff[3] (hereinafter also indicated as Ediff[n], simply). The difference Ediff[0], Ediff[1], Ediff[2] and Ediff[3] controls number of alignment shifting by the aligners 221a to 221d . Accordingly, outputs MaIn[0], MaIn[1], MaIn[2] and MaIn[3] (hereinafter also indicated as MaIn[n], simply) of respective aligners 221a to 221d has a digit position depending upon a maximum exponent Emax. Thus, the exponent part 228 determines number of alignment shifting of the aligners 221a to 221d by the difference Ediff[0], Ediff[1], Ediff[2] and Ediff[3], and, in conjunction therewith, generates the exponent Emax before normalization on the basis of the exponent part of the floating point number.

The exclusive OR gates EOR1 to EOR4, the exclusive OR gates EOR5 to EOR8 and a matching selecting portion 225 form a code processing portion. The exclusive OR gates EOR1 to EOR4 input the sign part of the floating point number corresponded to the multiplier factor and the multiplicand to make judgment of sign of the product of the multiplier factor and the multiplicand. Among sings S[0], S[1], S[2] and S[3] to be judged, one corresponding to Emax is selected as Smax by the matching selecting portion 225. Matching of the signs S[0], S[1], S[2] and S[3] with the representative sign Smax is judged by the exclusive OR gates EOR5 to EOR8. The judgement results Inv[0], Inv[1], Inv[2] and Inv[3] (hereinafter also indicated as Inv[n], simply) are supplied to corresponding aligners 221a to 221d. When logical values of the judgement results Inv[0], Inv[1], Inv[2] and Inv[3] are "1" the aligners 221a to 221d inverts the corresponding products M[n] to generate outputs MaIn [n]. This is a preparatory process for transformation of the products M[n] into complements of two. Thus, the code processing portion 229 generates the sign Smax before normalization and the sign Inv[n] for a results of multiplication of respective multiplier with respect to the code Smax, depending upon sign of the floating point number multiplied by respective multipliers 220a to 220d.

The four input adder 226 inputs outputs MaIn[n] of the aligners 221a to 221d in parallel for summing. Upon parallel addition process of four inputs, the sign Inv[n] is supplied. As discussed later in detail, the four input adder 226 performs process for adding +1 to the least significant bit of the output MaIn[n], for which preparatory process for obtaining complement of two is performed.

An output Macm of the four input adder 226 is supplied to a circuit 227 for normalization, obtaining positive number and rounding. This circuit performs normalization and obtaining positive number on the basis of exponent Emax before normalization, the output Macm of addition and the sign Smax for performing rounding adapting to single precision floating point number format to obtain the floating point number by performing rounding. The floating point number thus obtained is taken as a result of multiply-add operation of A[0]·B[0]+A[1]·B[1]+A[2]·B[2]+A[3]·B[3].

FIG. 5 shows one example of the maximum exponent selecting portion 223. By comparison of E[1] and E[0] by a comparator 2230, greater one is selected by a selector 2231. Similarly, E[3] and E[2] are compared by a comparator 2232 so that greater one is selected by a selector 2233. Those selected by both selectors are compared by a comparator 2234 so that greater one is selected by a selector 2235. The output of the selector 2235 is taken as the exponent Emax before normalization.

FIG. 6 shows one example of the matching selecting portion. A selector 2250 selects S[1] or S[0]. A selector 2251 selects S[3] or S[2]. A selector selects an output of the selector 2250 and an output of the selector 2251. Selection control signals of the selectors 2250 to 2252 are taken as a resultant signal MaxCntl of comparison of the comparators 2230, 2232 and 2234. By this, the sign part of the floating point number associated with the selected exponent as Emax is selected as sign Smax before normalization.

FIG. 7 shows one embodiment of the aligner 221a (221b to 221d). A shifter 2210 inputs M[n] and is controlled the number of alignment shift (shifting bit number) by Ediff[n]. An output of the shifter 2210 is inverted by an inverter 2211. The output of the inverter 2211 and the output of the shifter 2210 is selected by a selector 2212 by Inv[n], and the selected value is taken as MaIn[n].

Figures 8, 9:
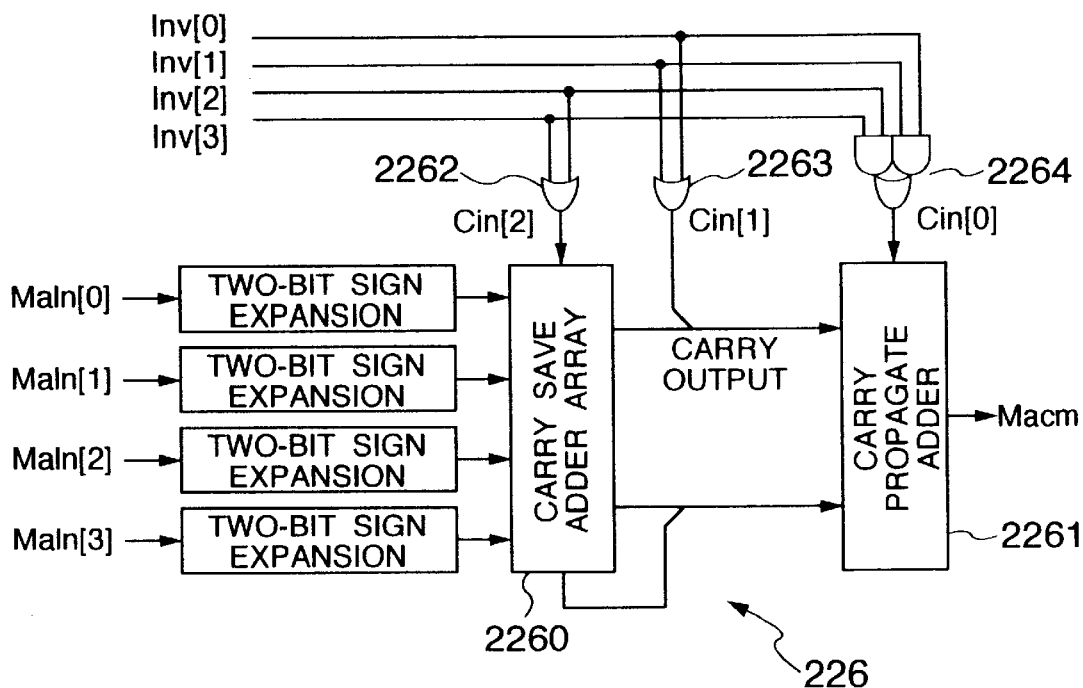
FIG. 8 is a block diagram of one embodiment of a four-input adder.
FIG. 9 is an explanatory illustration showing a possibly obtainable values of Cin[0], Cin[1] and Cin[2] with respect to Inv[n] in the four-input adder.

FIG. 8 shows one embodiment of a four input adder 226. The four input adder 226 has a circuit type, in which a sum (sum output) without carry and a carry (carry output) are derived separately by a carry save adder array 2260 and propagation of carry is delayed up to a timing where a final sum is obtained by a carry propagate adder 2261. The sum Macm obtained by the four input adder 226 can potentially increased for two bits relative to number of bits of the input at the maximum. The product MaIn[n] to be input to the four input adder 226 is supplied to the carry save adder array 226 with preliminary two bit sign expansion.

In FIG. 8, a post process for deriving complement of two is performed with three bits of carry signals Cin[0], Cin[1:] and Cin[2]. As can be clear from the foregoing explanation, the sign selecting portion 225 selects any one of S[n]. Therefore, at least one among Inv[n] is always set at logical value "0". Accordingly, objective for deriving complements of two should be three or less among MaIn[n]. This can be detected by an OR gate 2262, an OR gate 2263, and AND·OR gate 2264. In FIG. 9, possible values of Cin[0], Cin[1] and Cin[2] with respect to the value of Inv[n]. As can be clear from this, Cin[2] is set at a logical value "1" when a logical value of at least one of Inv[2] and Inv[3] is "1"Cin[1] is set at a logical value "1" when a logical value of at least one of Inv[1] and Inv[0] is "1", and Cin[0] is set at a logical value "1" when a logical values of both of Inv[1] and Inv[0] or Inv[2] and Inv[3] is "1".

Figure 10:
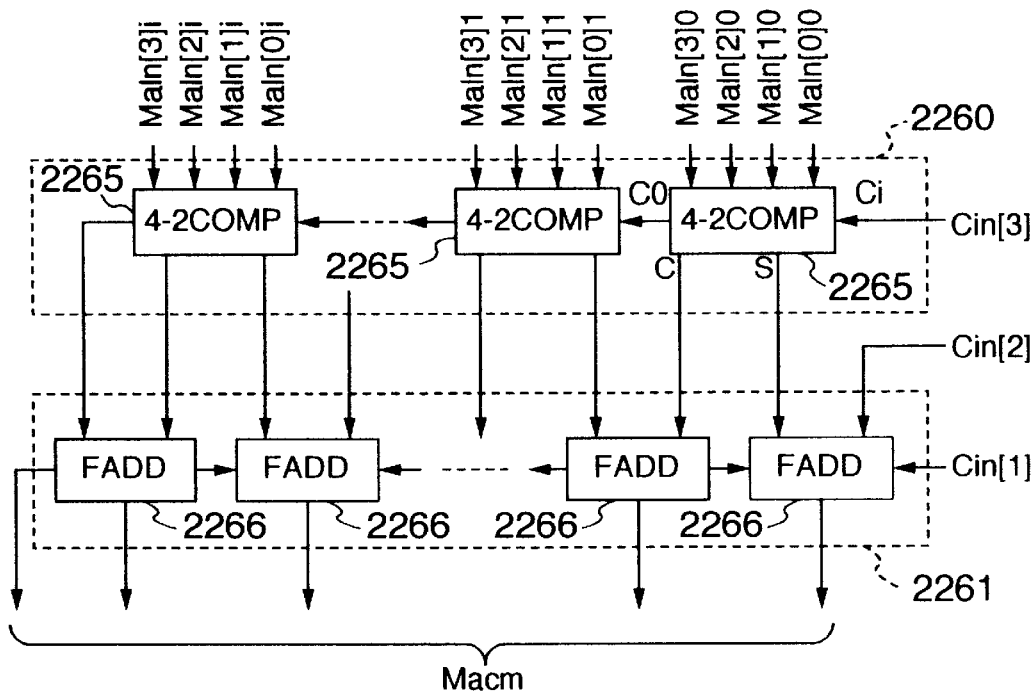
FIG. 10 is a block diagram showing a detailed construction of a carry save adder array and a carry propagate adder array.
Figure 11:
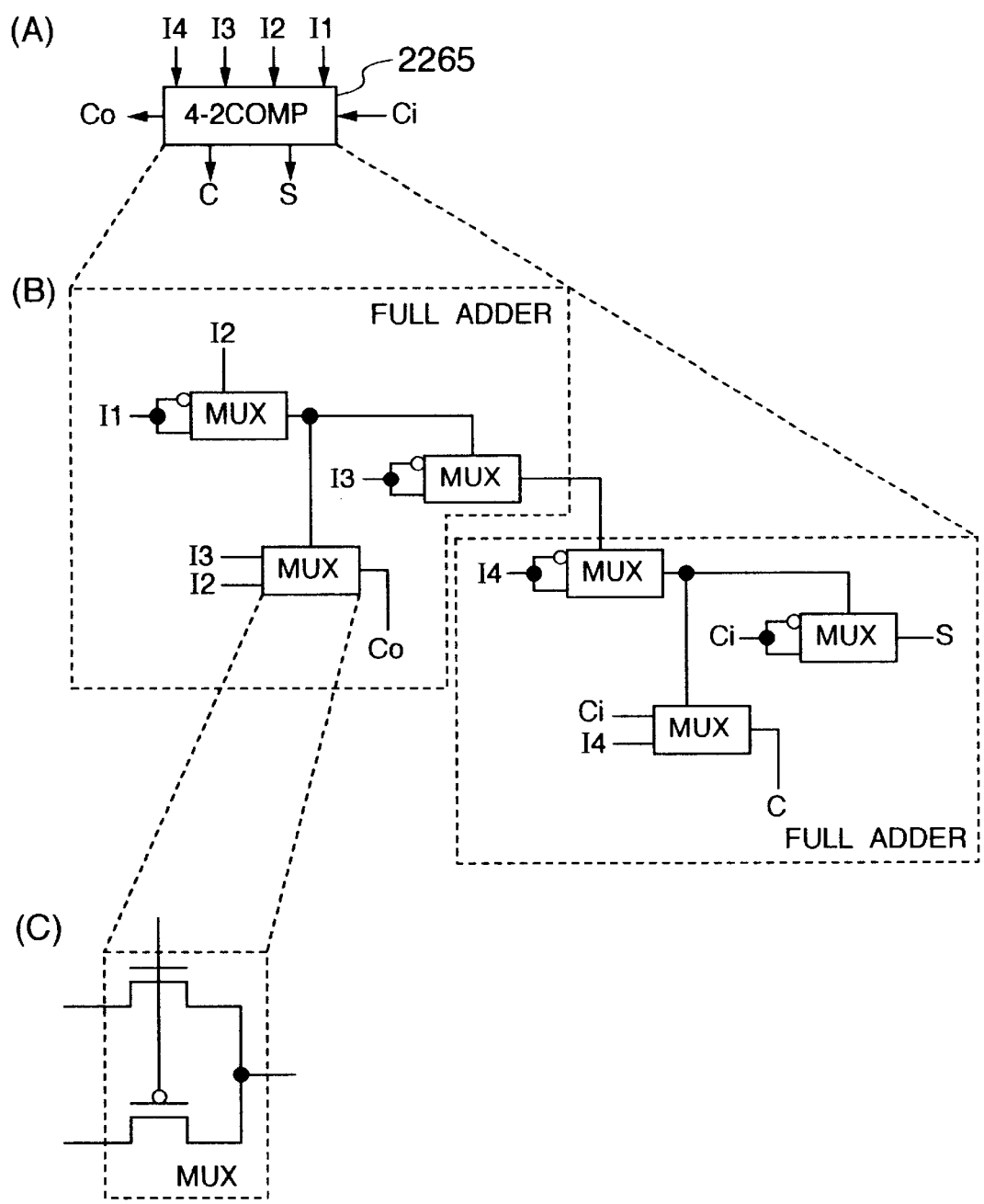
FIG. 11 is an explanatory illustration of one embodiment of a 4-2 compressor.

In FIG. 10, one embodiment of detailed logical construction of the carry save adder 2260 and the carry propagate adder 2261 are illustrated. While there is not particular limitation, the carry save adder 2260 is constructed with a plurality of 4-2 compressors (4-2COMP) 2265. Respective 4-2 compressor 2265 has five inputs (I1 to I4, Ci) and three outputs (S, C, Co) as exemplary illustrated in (A) of FIG. 11. The carry output Co is connected to a carry input Ci of the upper bit, the 4-2 compressor 2265 adds four bits I1 to I4. S is a summing output, C is a carry output caused by addition. In the 4-2 compressor 2265, Co does not depend on Ci. Nominally, carry transfer is not performed. For example, one 4-2 compressor 2265 may be constructed with two full adders, as exemplarily shown in (B) of FIG. 11. The full adder is not specified but may be constructed with employing three multiplexers as exemplarily illustrated in (C). It should be noted that as a publication disclosing the 4-2 compressor, there is "high speed 54×54 bit Multiplier Applied with Path Transistor Multiplexer", Technical Report of IEICE, ICD 94-135, DSP94-91 (October, 1994), Singaku Giho (the Institute of Electronics, Information and Communication Engineers), pp 73 to 79.

In FIG. 10, to respective of 4-2 compressors 2265, bits at the corresponding digit positions in the aligner outputs MaIn[0] to MaIn[3] are supplied per four bits in sequential order from the lower digit. MaIn[0] to MaIn[3] represent the lowermost four bits in MaIn[0] to MaIn[3]. The carry signal Cin[3] is applied to a carry input terminal Ci of the lowermost 4-2 compressor 2265. The carry propagate adder 2261 is constructed with a plurality of full adders 2261. The carry output is taken as carry input for upper full adder. One of the adding input of the full adder is the sum output S of the 4-2 compressor 2265, and the other adding input is the carry output C of the 4-2 compressor 2265 arranged at one upper digit. The carry signal Cin[2] is applied as one adding input signal of the lowermost full adder. The carry signal Cin[1] is applied as the carry input signal for the lowermost full adder.

Figure 13:
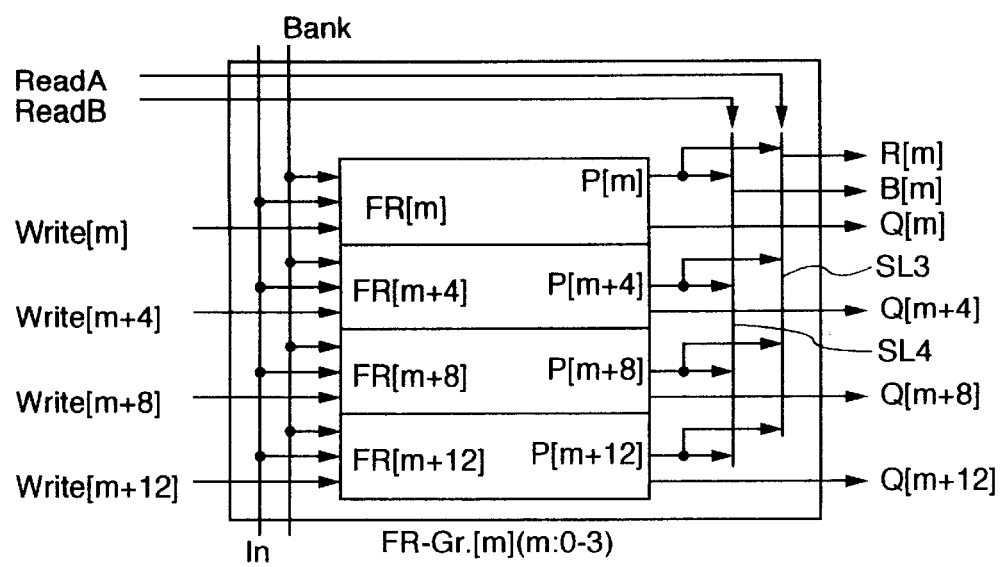
FIG. 13 is an explanatory illustration of a construction of respective register groups forming the register file.
Figure 12:
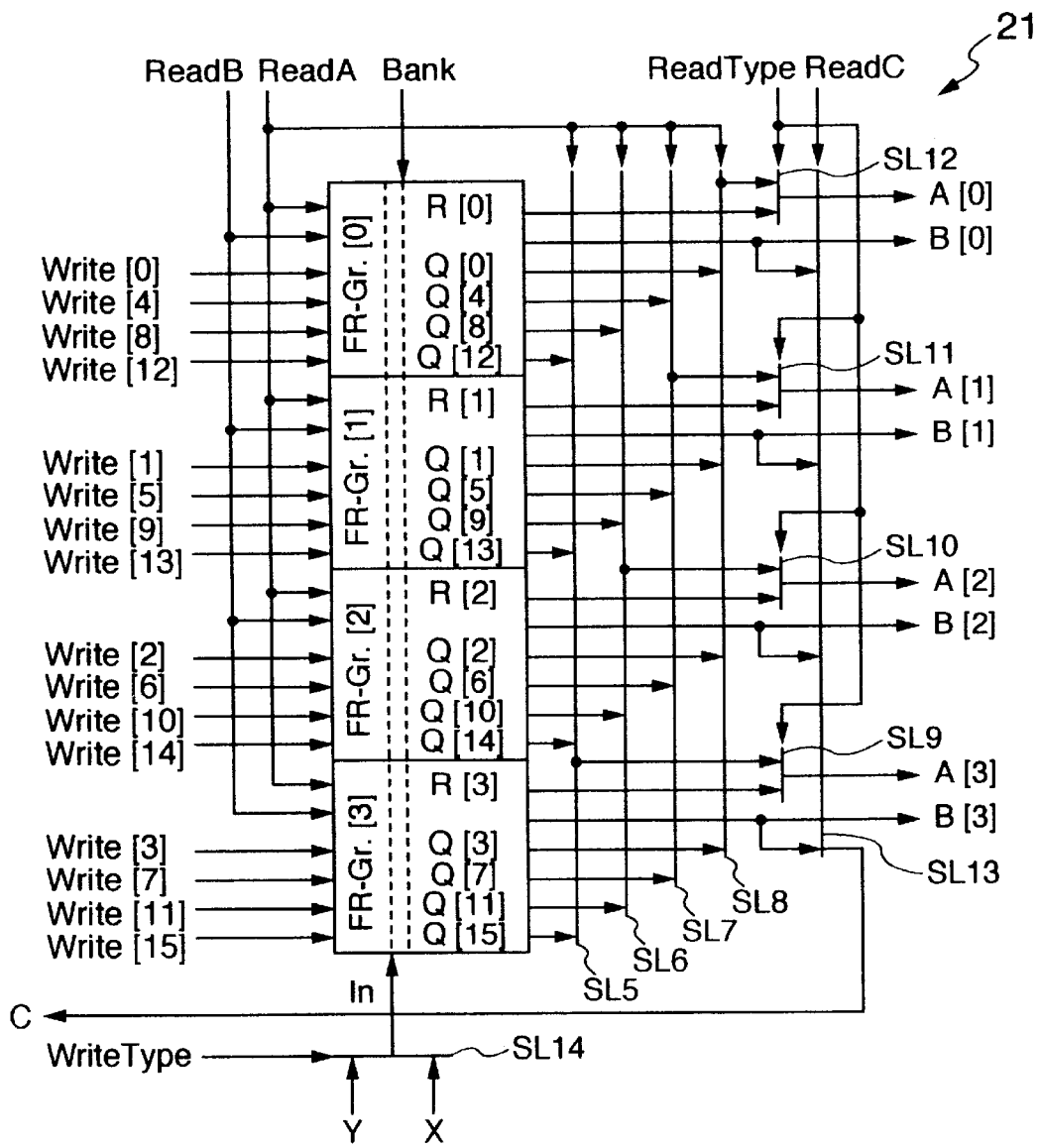
FIG. 12 is a block diagram of one embodiment of a register file.
Figures 14, 15:
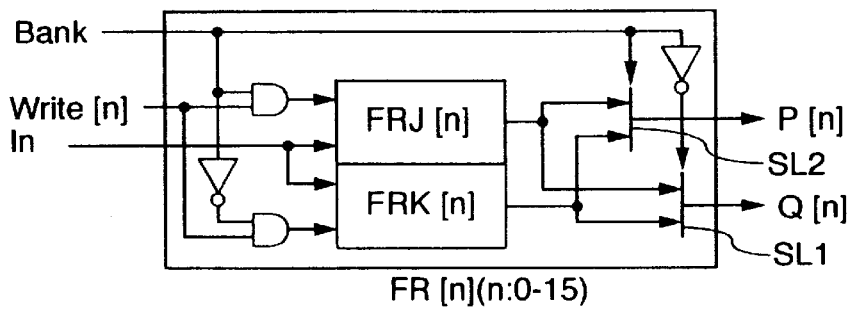
FIG. 14 is an illustration showing a construction of one embodiment of each register circuit in the register group.
FIG. 15 is an explanatory illustration showing mode of operation of a read port A of the register file.

FIG. 12 shows a block diagram showing one example of the register file. FIG. 13 shows a construction of each register group forming the register file, and FIG. 14 shows a construction of each register circuit of the register group.

The register file 21 is not particularly specified but have four register groups FR-Gr.[0] to FR-Gr.[3] as shown in FIG. 12 and four register circuits FR[m], FR[m+4], FR[m+8] and FR[m+12] shown in FIG. 13. In FIG. 13, m is an integer of 0 to 3. As shown in FIG. 14, respective register circuit has a pair of registers FRJ[n] and FRK[n] for forming the front-bank and the back-bank. In FIG. 14, n is an integer of 0 to 15. Commanding for writing operation for the registers FRJ[n] and FRK[n] is given by a signal Write[n]. Any one of the registers as objective for writing is selected by a signal Bank. Correspondence of the registers FRJ[n] and FRK[n] and terminals P[n] and Q[n] can be mutually switched by selectors SL1 and SL2 by the signal Bank. In one register group shown in FIG. 13, terminals P[m], P[m+4], P[m+8] and P[m+12] of four register circuits can be connected to a terminal R[m] by selecting one of these by the selector SL3 in response to two bit signal ReadA, and similarly, to a terminal B[m] by selecting one of these by the selector SL4 in response to two bit signal ReadB. Terminals Q[m], Q[m+4], Q[m+8] and Q[m+12] of the register group are selected per register group by selectors SL5 to SL8 controlled by the signal ReadA. The outputs of the selectors SL5, SL6, SL7 and SL8 and outputs R[3], R[2], R[1] and R[0] of respective register groups are selected by selectors SL9, SL10, SL11 and SL12 controlled by a signal ReadType, and selected outputs are output to read ports A[3], A[2], A[1] and A[0]. Accordingly, from the read ports A[3], A[2], A[1] and A[0], data is read per one in parallel from four floating point registers per register group, as shown in FIG. 15. Alternatively, data is read per one from each group in parallel. On the other hand, outputs B[3], B[2], B[1] and B[0] of respective register group are taken as outputs B[3], B[2], B[1] and B[0] as they are. As shown in FIG. 16, data is read from each register group per one in parallel. To the read port C, one of the outputs B[3], B[2], B[1] and B[0] of respective register groups selected by the selector SL13 according to a signal ReadC is connected. Accordingly, as shown in FIG. 17, the register is arbitrarily selected depending upon the condition of the signals ReadB and ReadC for reading out from a port C. An input from the write ports X and Y can be selected by a selector SL as controlled by the signal WriteType.

Inner Product Operation

Discussion will be given with respect to inner product operation using the FPU 2. For example, the inner product can be used for deriving a brightness of a surface when a light is irradiated on a specific surface in a three-dimensional space, as shown in FIG. 18. The FPU 2 can derive an inner product i of a vector V1 (=[X1, Y1, Z1, W1]) and V2 (=[X2, Y2, Z2, W2]) by one inner product operation command ft pr Vn, Vm of floating point (also referred to as inner product operation command, simply).

Process of inner product operation command is briefly illustrated in FIG. 19. For example, it is assumed that [X1, Y1, Z1, W1] is loaded in the vector register V0 of the register file 21 and [X2, Y2, Z2, W2] is loaded in V4. When the inner product operation command is decoded by the control portion 23, read operation of the register file is controlled to supply X1 and X2 to the multiplier 220a, Y1 and Y2 to the multiplier 220b, Z1 and Z2 to the multiplier

220c and W1 and W2 to the multiplier 220d, in parallel, respectively. While the exponent processing portion, sign processing portion and so forth are neglected from illustration, results of parallel multiplication are added by the four input adder 226 through inversion, shifting and so forth by the aligner, and then normalization and so forth is performed by resultant sum to obtain the inner product. Obtained inner product is overwritten through the port X holding the value of W1 in the vector register V0. Thus, inner product operation of the floating point can be performed in parallel for speeding up inner product operation.

FIG. 20 shows one example of specification concerning use of the register file in the foregoing inner product operation command. Namely, a result of inner product operation of vectors V[m] and V[n] is stored in the floating point register FR[n+3]. Components of the vector [n] are loaded to the floating point registers FR[n], FR[n+1], FR[n+2] and FR[n+3]. Here, n is any one of 0, 4, 8 and 12. It should be appreciated that FR[n] corresponds to the register fn of the front-bank. In view of structure of the register file 21, the register FR[n] is assigned to the register FRJ[n] when the control signal Bank=0, and to the register FRK[n] when the control signal Bank=1. In this specification, the vector data V[n] is stored in the registers FRJ[0], FRJ[1], FRJ[2] and FRJ[3] designated the output from the port A by Bank=0 and ReadA=0, and the vector data V[m] is stored in the registers FRJ[4], FRJ[5], FRJ[6] and FRJ[7] designated the output from the port B by Bank=0 and ReadB=1, for example, then, foregoing inner product operation can be performed by applying eight component data necessary for inner product operation of V[n] and V[m], in parallel. Upon operation, in practice, is designated by reading the register or by a register designation field of the inner product operation command. For designation by the register designation field, 4 bits is used for designation of a source register and a destination register.

Vector Transforming Operation

Next, discussion will be given in connection with a vector transforming operation employing FPU 2. Known four row and four column of transformation matrix may express transformation of translation, rotation, expansion and perceptive and so forth. BY a product of the transformation matrix and the vector, vector transformation expressed by the transformation matrix can be obtained. The vector transforming operation is generally expressed as shown in FIG. 21. A is the transformation matrix, P is data to be an objective for transformation, and P' is data after transformation. Such vector transformation can be obtained by one floating point vector transforming operation command (also referred to as vector transforming operation command, simply) ftrv back, Vn.

Process according to the vector transforming operation command is briefly illustrated in FIG. 22. For example, the transformation matrix is arranged in sixteen registers in the back-bank. Then, the vector data [Xi, Yi, Zi, Wi] is stored in the register forming the front-bank.

The process according to the vector transforming operation command is substantially equivalent to a process sequentially repeating inner product operation for four times. Namely, process of calculation of [Xi, Yi, Zi, Wi]×[a11, a12, a13, a14] to write the result in Xi region, calculation of [Xi, Yi, Zi, Wi]×[a21, a22, a23, a24] to write the result in Yi region, calculation of [Xi, Yi, Zi, Wi]×[a31, a32, a33, a34] to write the result in Zi region, and calculation of [Xi, Yi, Zi, Wi]×[a41, a42, a43, a44] to write the result in Wi region, are executed sequentially. Respective process is substantially the same as the inner product calculation process.

Once the vector transforming operation command is decoded by the control portion 23, the data for performing the first inner product calculation process are supplied in parallel to the multipliers 220a to 220d or so forth from the register file 21. Similarly, the exponent processing portion and the sign processing portion and so forth are neglected from illustration in FIG. 22. Results of multiplication in parallel are added by the four input adder 226 via shifting, inversion and so forth by the aligner to perform normalization or so forth for the result of addition to obtain the inner product. The obtained inner product is written in the register holding Xi. Such processes are repeated with sequentially switching read objective register and write objective register of the register file. Thus, by sequentially repeating the inner product process of the floating point for four times, result of vector transformation can be obtained at high speed.

FIG. 23 shows one embodiment of specification concerning use of the register file in the vector transforming operation command. Namely, a product of vector V[n] and transformation matrix is overwritten in the register V[n]. The components of the vector V[n] are loaded to the floating point registers FR[n], FR[n+1], FR[n+2] and FR[n+3]. here, n is any one of 0, 4, 8 and 12. Also, it should be appreciated that FR[n] corresponds to the register fn of the front-bank. The transformation matrix is stored in the registers FB[0] to FB[15] (register corresponding to b0 to b15 of FIG. 2). In view of construction of the register file 21, the register FB[n] is assigned to the register FRK[n] when the control signal Bank=0, and to the register FRJ[n] when the control signal Bank=1.

In this specification, the transformation matrix

Matrix is output in parallel from the port A in the condition of ReadType=1, in FIG. 15, and the vector V[n] is output in parallel from the port B. For example, in the initial inner product operation, referred to FIG. 15, since ReadType=1, Bank=1 and ReadA=0, the first line of the transformation matrix Matrix is output from the port A based on FRJ[0], FRJ[4], FRJ[8] and FRJ[12]. In conjunction therewith, since Bank=1 and ReadB=0, on the basis of FRK[0], FRK[1], FRK[2] and FRK[3], the transformation objective vector [Xi, Yi, Zi, Wi] is output from the port B. In subsequent three times of inner product operation, at every occasion, selection of ReadA may be varied as 1, 2, 3. The read objective register from the B port is the same in four times of inner product operation.

A plurality of times of inner product calculation process according to one vector conversion command, is performed by a pipeline process as shown in FIG. 24. Namely, four pipeline processes are executed by one command. One pipe of the inner product calculation process is consisted of a register read stage RR, a first arithmetic stage F1, a second arithmetic stage F2, a third arithmetic stage F3, a register write stage RW and not illustrated instruction fetch stage. The instruction fetch stage is naturally arranged before the register read stage RR. On the other hand, the register read stage RR includes an instruction decoding process. In the shown embodiment, arithmetic operation from multiplication to normalization is performed through three arithmetic stages. The process to be executed in the pipeline of (1) of FIG. 24, is to perform the inner product operation of (FB[0], FB[4], FB[8], FB[12])×V[n] for writing the result to the register FR[n]. The arithmetic operation to be executed in the pipeline of (2) is to perform the inner product operation of (FB[1], FB[5], FB[9], FB[13])×V[n] for writing the result to the register FR[n+1]. The arithmetic operation to be executed in the pipeline of (3) is to perform the inner product operation of (FB[2], FB[6], FB[10], FB[14])×V[n] for writing the result to the register FR[n+2]. The arithmetic operation to be executed in the pipeline of (3) is to perform the inner product operation of (FB[3], FB[7], FB[11], FB[15])× V[n] for writing the result to the register FR[n+3]. The destination registers FR[n], FR[n+1], FR[n+2] and FR[n+3] are also the source registers of V[n].

At this time, in a sequence of four times of inner product calculation process, the register write RW in the leading pipeline (1) is performed after register read RR in the final pipeline (4). In other words, a sequence of arithmetic cycle of the inner product operation by reading from the component of V[n] and the component of the transformation matrix, and writing the result of the inner product in the register file, is sequentially executed for a plurality of times. In the final arithmetic cycle to be executed a plurality of times sequentially, latency of respective arithmetic cycles is controlled so that the reading operation of the register file becomes faster than writing timing of the result of the inner product operation in the register file. Accordingly, even when the source register and the destination register are the same register, writing is not performed until reading of all data from the source register is completed to undesirably loss the data V[n].

Even if the source register and the destination register in the vector transforming operation are the same, operation is not interfered.

Since the vector data of before and after transformation are arranged in the same register, generation of program frequently using the vector transformation process is facilitated. On the other hand, in the vector transformation operation in the three-dimensional graphics or so forth, the vector transformation operation is performed for a plurality of vectors or points. At this time, if the data before and after transformation are arranged in the same register, and by loading four vector data in the sixteen floating point registers forming the front-bank, the vector transformation command is sequentially executed for four times, sequentially. Namely, number of times of loading of the arithmetic operation objective data for the sixteen floating point register or storing operation of the resultant data of arithmetic operation to the memory, can be reduced. In contrast to this, when data before and after transformation are stored in separate registers, since eight floating point register is occupied in execution of one vector transformation command, frequency of loading of the arithmetic operation objective data or storing operation of the resultant data of arithmetic operation becomes high. In this sense, capability of making the source register and the destination register of the vector data in the vector transformation operation common, is useful in speeding up of the vector transformation operation in the limited number of registers.

Sine Cosine Operation In the arithmetic block 22, by adding the coefficient table or feedback circuit of the multiplier to the hardware for inner product operation, trigonometric functions or approximated value of a square root can be derived by zone division and development of high order polynomial expression. For example, the transformation matrix includes sine and cosine upon rotational transformation. When a data table of sine and cosine is established with respect to all of necessary angles, increasing of chip area cannot be ignored.

Here, discussion will be given for deriving of approximated value of sine and cosine utilizing the arithmetic block 22. The FPU added toe construction discussed later, executes sine cosine command for calculating sine and cosine in parallel by one command. The specification of the sine cosine command is to calculate a value of sine with respect to the angle data loaded to the floating point register FR[0] to write the result in the register FR[n], and similarly, to calculate cosine with respect to the angle data loaded in the register FR[0] to write the result in the register FR[n+1], as shown in FIG. 25.

FIG. 26 shows a format of the angle data. The angle data expressed rotation speed by a32-bit fixed point number taking a boundary between upper 16 bits and lower 16 bits of one floating point register as the fixed decimal point position. Across the decimal point position, the upper sixteen bits represents the rotation speed (integer), and the lower sixteen bits across the decimal point defines one turn with division into the sixteenth power of two. Particularly, among lower sixteen bits, upper two bits represents a quadrant, in which an angle specified by the data of sixteen bits below decimal point. In such angle format, for example 360° is represented by 1.0 and the bit pattern of the sexadecimal number is "00010000".

The sine cosine command obtains sine and cosine with respect to the angle data of the foregoing angle format by polynomial approximation according to Tayler expansion. FIG. 28 shows a method of arithmetic operation therefor.

The foregoing polynomial approximation is for calculating values of sine and cosine corresponding to the angle data by dividing sixteen bits below decimal point of the angle data into a center value x and a difference value dx with respect to the center value. Only values of sine and cosine with respect to the center value x required for polynomial approximation are held in a form of a table. The center value x is assumed as a value derived by counting a fraction over one as one and disregarding the rest of the least significant bit of seven bits below decimal point of the register FR[0]. A relationship between the center value and the angle (radian) is exemplarily illustration in FIG. 27. The difference dx is a value derived by sign expansion of ten bits from the least significant bit of the register FR[0]. Since Tayler expansion is employed in the polynomial approximation, coefficients of respective terms are provided for expressing the angle by radian. In FIG. 28, S1 to S12 show contents of arithmetic process employing the multiplier 220a (FMO), the multiplier 220b (FM1), the multiplier 220c (FM2), the multiplier 220d (FM3) and the four input adder 226 by expressions. In S9, an approximated value of sign is derived by the polynomial approximate expression (polynomial approximate expression is shown in FIG. 28). In S12, an approximated value of cosine is derived by the polynomial approximate expression (the polynomial approximate expression is shown in FIG. 28).

Arithmetic operation in S1 to S12 will be processed in pipeline shown in (1) to (4). As set forth above, the upper two bits among lower sixteen bits of the angle data represents a quadrant, in which the angle specified by the data of sixteen bits below decimal point. Accordingly, the control portion controls sign reversal of the results of arithmetic operation in S10 and S12 by polynomial approximation and selection of the register FR[n] or FR[n+1] to store the result of arithmetic operation, depending upon result of decoding of upper two bits (according to quadrant, in which the angle specified by the angle data) so that the values of sine and cosine are stored in the register FR[n] or FR[n+1] assigned depending upon the quadrant. Reversing operation and register selecting operation per quadrant is illustrated in FIG. 28.

Figure 29:
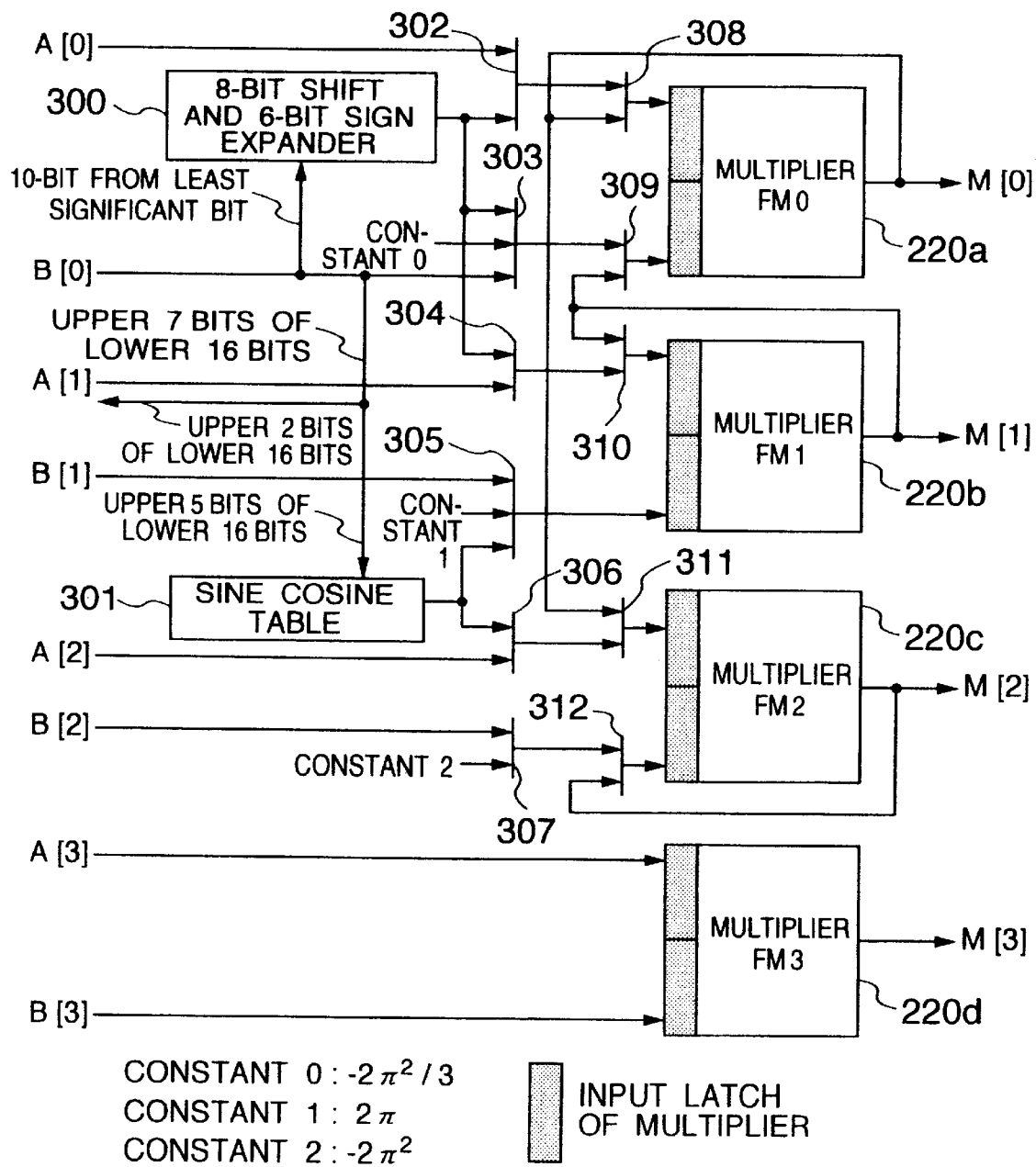
FIG. 29 is a block diagram in the vicinity of a multiplier added a coefficient table for executing sine-cosine command and a feedback system of the multiplier.

FIG. 29 shows a block diagram in the vicinity of the multiplier added a coefficient table and a feedback system for the multiplier for executing the sine cosine command. Base of the circuit of FIG. 29 is the arithmetic block of FIG.

4. With respect to the arithmetic block 22 of FIG. 4, the circuit is merely differentiated in addition of eight bit and six bit sign expander 300, a coefficient table 301 and selectors 302 to 312. The angle data of the register FR[0] is applied from the port B[0].

The eight bit and six bit sign expander 300 is a circuit for generating the difference dx from least 20 bits of the register FR[0]. The coefficient table 301 holes either one of data of sine or cosine depending upon the center value shown in FIG. 27 to output data of sine and cosine of the angle designated by lower five bit in the lower sixteen bits of the angle data. The upper two bits of the lower sixteen bits of the angle data is supplied to the control portion. The control portion thus controls selective reversal of the adding output by the four input adder and selection of the register FR[n] or FR[n+1] to store the adding result, according to the value of the two bits. It should be noted that when the coefficient table has sine data, the cosine may be derived with making reference to the table with an angle subtracting the angle of the center value x from $\pi/2$. It is also possible to have both of data of sine and cosine in the coefficient table.

Figure 32:
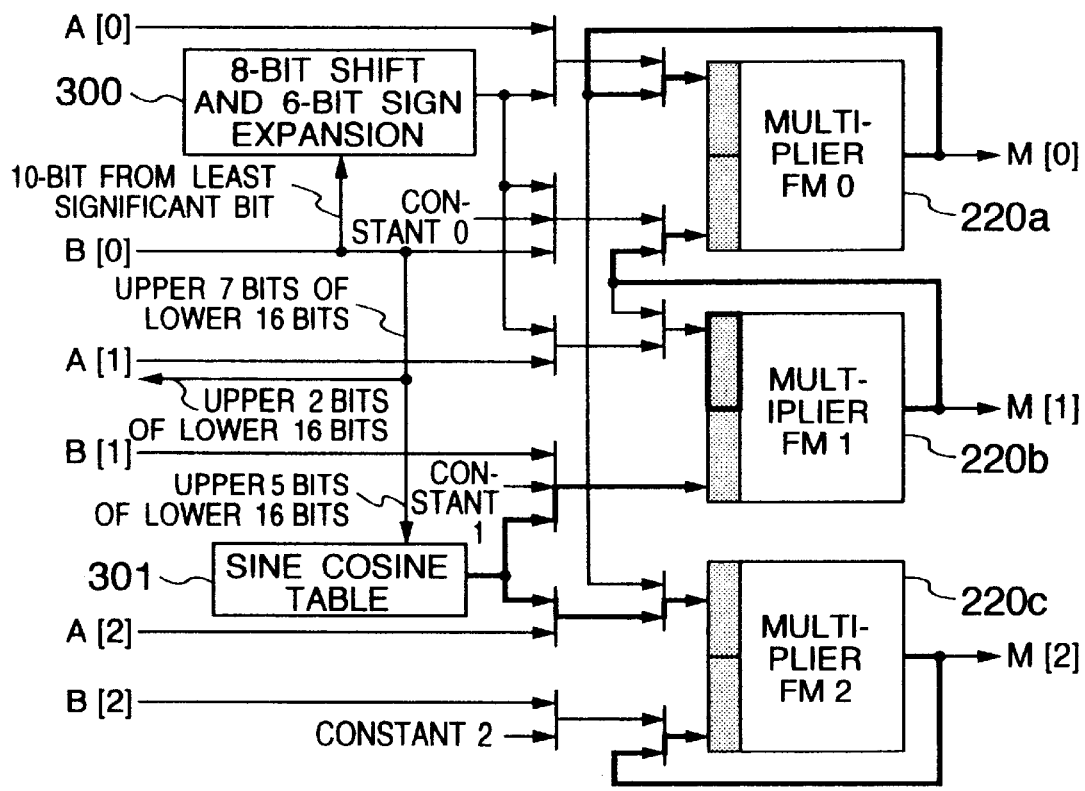
FIG. 32 is an explanatory illustration showing flow of data in the second step shown by (3) of FIG. 28, by a thick line.

FIG. 30 shows flow of data in the first step shown in (1) of FIG. 28, by the thick line. FIG. 31 shows flow of data in the second step shown in (2) of FIG. 28, by the thick line. In these figures, while the result of multiplication of the multiplier (FMO) 220a is fed back to the selectors 308 and 311, only bits below the decimal point is fed back (setting upper bit to zero) to obtain the effect of +1. FIG. 32 shows flow of data in the second step shown in (3) of FIG. 28, by the thick line. FIG. 33 shows flow of data in the second step shown in (4) of FIG. 28, by the thick line. When the result of arithmetic operation is used twice in FIGS. 32 and 33, updating of input latch of the multiplier is restricted to hole the value. Control of the arithmetic operation shown in FIGS. 30 to 32 is performed by the control portion which decodes the sine cosine command.

Superiority of Data Processor 1

Figure 34:
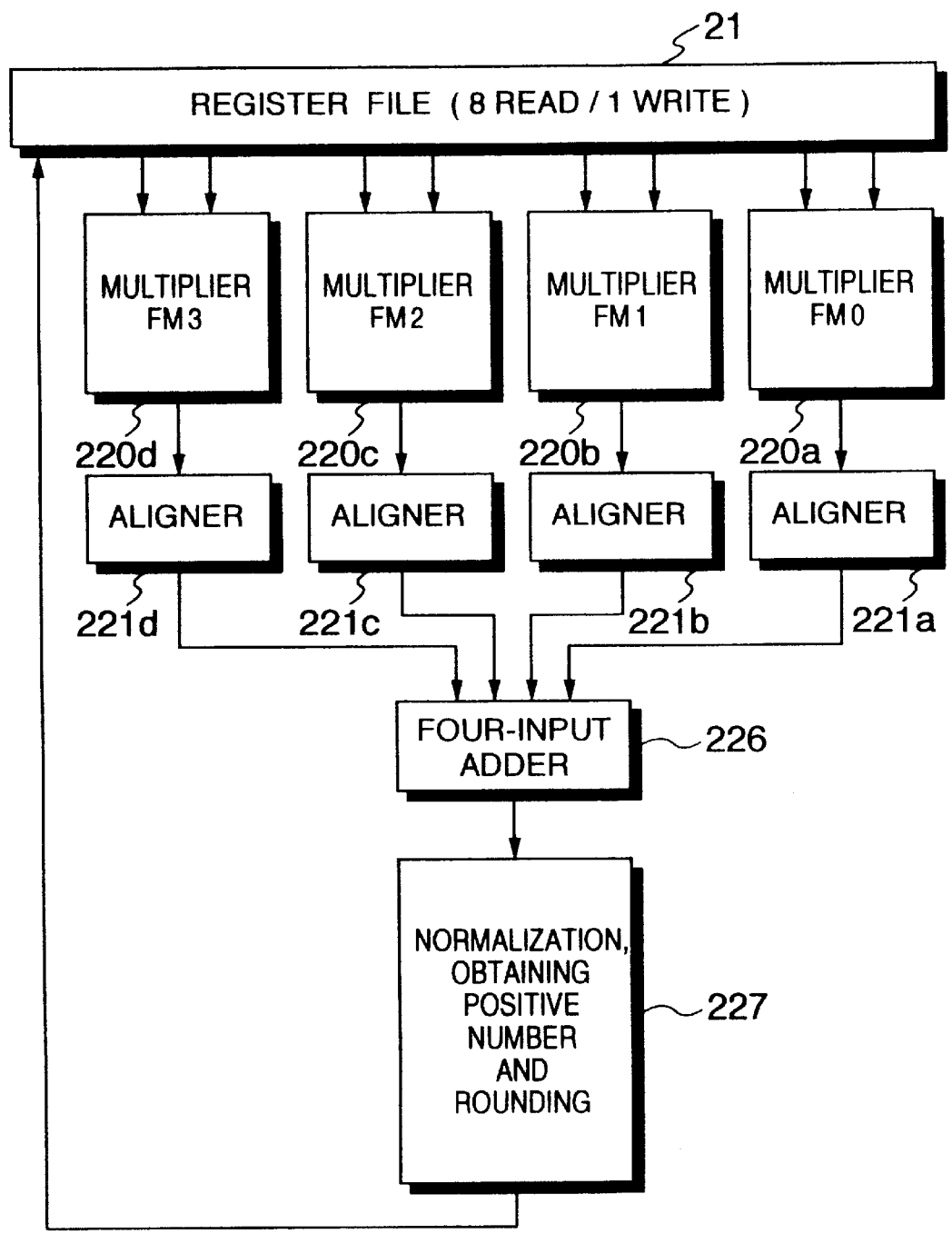
FIG. 34 is a block diagram briefly showing an operation block 22 for facilitating understanding of flow of data in operation process upon execution of the inner product operation command or the vector transformation command.

As set forth above, the arithmetic block 22 of the FPU 2 applies eight floating point numbers to four multipliers 220a to 220d for parallel operation upon execution of one command, such as inner product operation command, vector transformation operation command, and adds the results of multiplication there of by one four input adder 226 to obtain the result of arithmetic operation. Normalization, obtaining positive number and rounding for the output of the four input adder 226 is performed by one circuit 227. In FIG. 34, general construction of the arithmetic block 22 is illustrated for facilitating understanding of flow of data in the arithmetic process.

Figure 35:
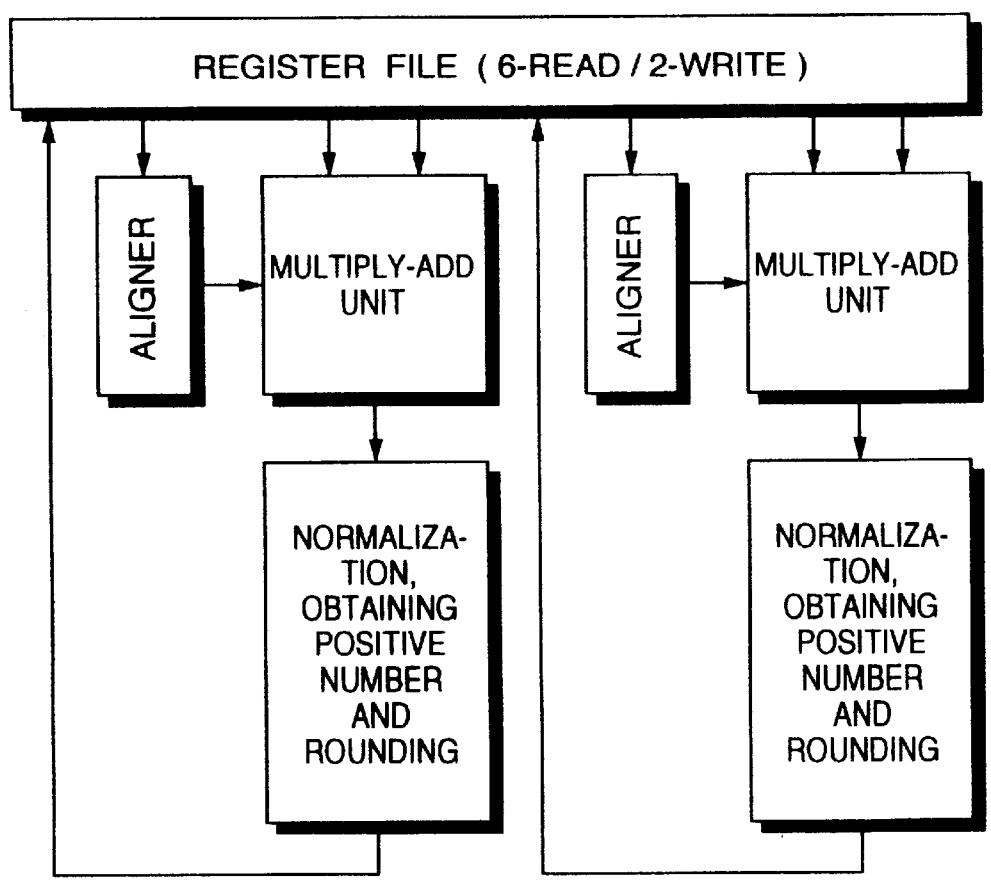
FIG. 35 is a comparative explanatory illustration showing an example, in which two sets of the multiply-add unit and a circuit for normalizing, obtaining positive number and rounding, are arranged in parallel.
Figure 36:
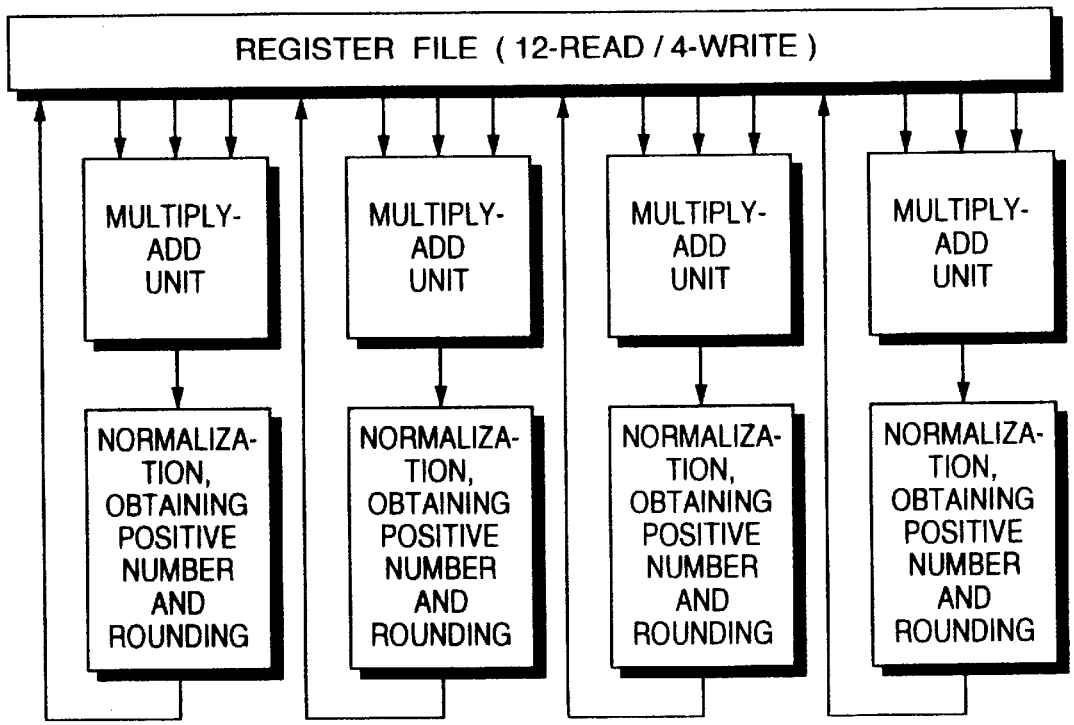
FIG. 36 is a comparative explanatory illustration showing an example, in which four sets of the multiply-add unit and a circuit for normalizing, obtaining positive number and rounding, are arranged in parallel.

In FIG. 35, a comparative example to the foregoing arithmetic block 22 is illustrated. This is constructed by providing two sets of the multiply-add units for a pair of floating point number and the circuits for normalization, obtaining positive number and rounding. In FIG. 36, another comparative example for the foregoing arithmetic block 22, in which four sets of the multiply-add units for a pair of floating point number and the circuits for normalization, obtaining positive number and rounding are provided, is illustrated. Either comparative examples are constructed by simply arranging a plurality of sets of the multiply-add units and the circuits for normalization, obtaining positive number and rounding. Accordingly, when one inner product of 4×4 is to be calculated, it is not sufficient to simply operate the circuits for multiply-add operation, normalization, obtaining positive number and rounding in parallel. Control in consideration of correlation with respect to respective result of arithmetic operation is required separately. Normally, the inner product may be derived by repeated operation for four times by multiply-add unit and the circuit for normalization, obtaining positive number and rounding. In case of vector transforming operation, further greater number of arithmetic cycles become necessary. A plurality of sets of circuits for multiply-add operation, for normalization, obtaining positive number and rounding are operated in parallel for inner product operation for different objects or other floating point number command, by instruction executing method, such as pipeline. In this sense, the circuit construction shown in FIGS. 35 and 36 is characterized in the point for improving performance of arithmetic process of various floating point number command in average.

When the arithmetic block is employed, number of substantial arithmetic cycles for the inner product operation or vector transformation operation can be reduced. Namely, speeding up of the inner product operation or the vector transformation operation can be realized. Thus, construction of the arithmetic block 22 is specialized for speeding up of the inner product operation and the vector transformation operation. On the other hand, since the inner product can be obtained by one parallel multiplication and addition, process for performing rounding per every multiply-add operation for two inputs, becomes unnecessary. By this, latency of the inner product operation can be shortened and accuracy of arithmetic operation becomes high. Also, it may not happen to cause a difference in result of arithmetic operation in different order of arithmetic operation as in the case where rounding is repeated at every multiply-add operation for two inputs.

Figure 37:
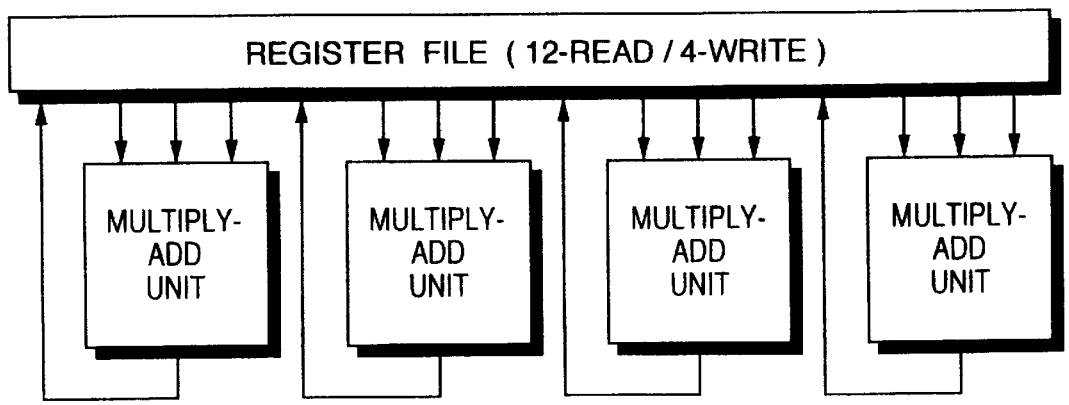
FIG. 37 is a comparative explanatory illustration showing an example, in which four multiply-add units are arranged in parallel for integer operation.

On the other hand, the circuit for normalization, obtaining positive number and rounding may have equivalent circuit scale as that of the multiply-add unit. Therefore, in the construction where a plurality of sets of the circuits for multiply-add operation, normalization, obtaining positive number and rounding are simply arranged in parallel as shown in FIGS. 35 and 36, increasing of chip area for parallel processing in relation to improvement of performance of arithmetic operation in average to be achieved by parallel processing, becomes significantly large. In view of this, it has been considered that two is reasonable as number of the circuits for multiply-add operation, normalization, obtaining positive number and rounding to be arranged in parallel. It should be realistic to arrange for multiply-add units in parallel as shown in FIG. 37, in case of only for the arithmetic operation of integer. However, in case of arithmetic operation of integer, since number of digits of data is limited, accuracy of arithmetic operation becomes lower than that of the floating point operation. The arithmetic block 22 of FIG. 34 is required to have one circuit 227 for normalization, obtaining positive number and rounding. Accordingly, increasing of the circuit scale can be minimized with realizing speeding up of the inner product operation and the vector transformation operation of floating point.

The floating point number command of the data processor 1 has a fixed length of sixteen bits. Therefore, an address designation field in the floating point number command is limited, and number of the floating point registers is sixteen. Under such constraint, the floating point register is constructed with a register file 21 of the register bank structure having the back-bank and the front-bank. At this time, since sixteen registers are occupied for storing the whole transformation matrix, the specification of instruction for using both of the front-bank and the back-bank is employed for the vector transforming operation command. As set forth above, the transformation matrix is arranged in the back-bank and the vector data is arranged in the front-bank. By this, under constraint of resource of bit number of the floating point command and number of registers, high speed execution of the vector transforming operation command can be assured.

On the other hand, in execution of the vector transforming operation command, a series of four times of inner product calculation process is pipelined so that the register write RW in the leading pipeline (1) is executed after the register read RW in the last pipeline (4). Accordingly, even when the source register and the destination register are the common register, the vector data as the object for arithmetic operation will never lost unwantedly. Thus, when vector transformation for a plurality of vectors or points is performed sequentially, if the data before and after transformation are arranged in the same register, the vector transformation command can be sequentially executed for four times by loading four vector data to the sixteen floating point registers forming the front-bank. Thus, occurrence of such loading of the objective data for arithmetic operation for the sixteen floating point register and storing operation of the resultant data of the arithmetic operation, can be reduced. In this sense, capability of making the source register and the destination register of the vector data in the vector transforming operation in common, is useful in speeding up of vector transforming operation under limited number of registers.

On the other hand, the transformation matrix may includes sine and cosine in rotational transformation. To have the data table 301 of sine and cosine for all necessary angles, increasing of chip area for this cannot be ignored. Since the arithmetic block 22 includes four multipliers, the approximated values of trigonometric function and square root can be derived by zone division and high order polynomial expansion by adding the coefficient table 301 and the feedback circuit of the multiplier. By this, sine and cosine can be derived without increasing chip area. Particularly, since there is a similarity in expansion expression of polynomial approximation of sine and cosine, values of sine and cosine are simultaneously (in parallel) calculated utilizing this so that the values of sine and cosine can be obtained at high speed in comparison with the case where they are derived individually.

Figure 38:
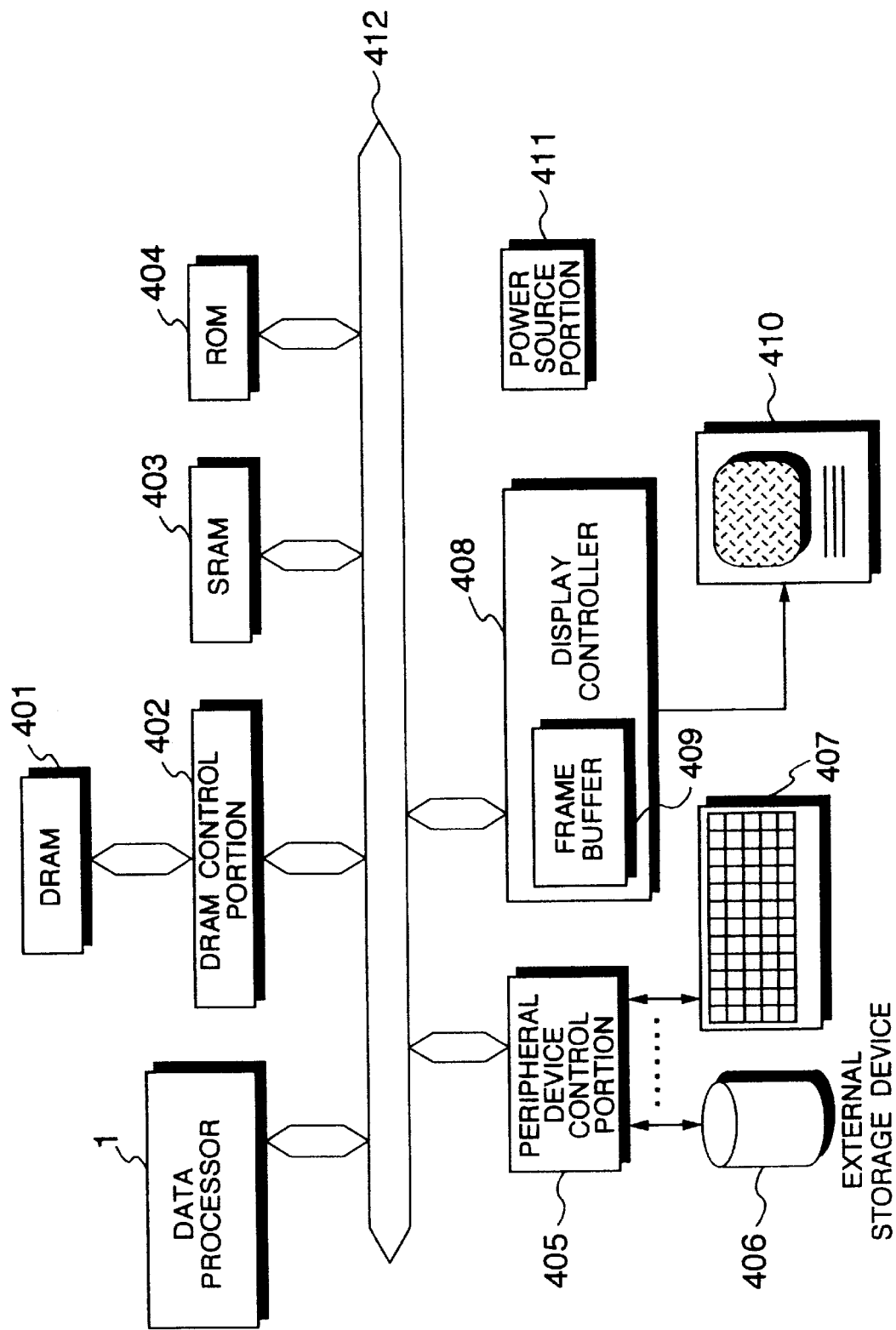
FIG. 38 is a block diagram showing one example of a data processing system, to which the data processor is applied.

FIG. 38 shows a block diagram of a data processing system applied such data processor.

In FIG. 38, 1 denotes the data processor, 401 denotes a dynamic random-access-memory (DRAM), 402 denotes a DRAM control portion performing address multiplexing control or refresh control for DRAM 401, and 403 denotes an SRAM. SRAM 403 is used as work area of the data processor 1 or a temporary storage region of data. The reference numeral 404 denotes ROM holding OS (Operating System) or the like of the data processor 1. The reference numeral 405 denotes a peripheral device control portion, to which an external storage device 406 and a keyboard 407 are connected typically. The reference numeral 408 denotes a display controller having a frame buffer 409 or a not shown drawing and display control logic circuit, to perform drawing control and display control for a display 410. The reference numeral 411 denotes a power source circuit, and 412 denotes a bus as illustrated as representation. The data processor 1 can execute inner product operation, vector transforming operation and so forth of floating point, frequently used in three-dimensional graphics process, at high speed. Furthermore, since the foregoing effect can be obtained under the resource where the number of bits of the floating point instruction and number of registers are limited, a cost of the data processor 1 can be low. Accordingly, the data processing system of FIG. 38 can lower the cost of the system and perform three-dimensional graphic process at high accuracy and high speed. Accordingly, the data processing system superior in a game machine, handheld PC or so forth which has severe constraint in the cost and not ignoble demand for higher performance and higher speed.

Figure 39:
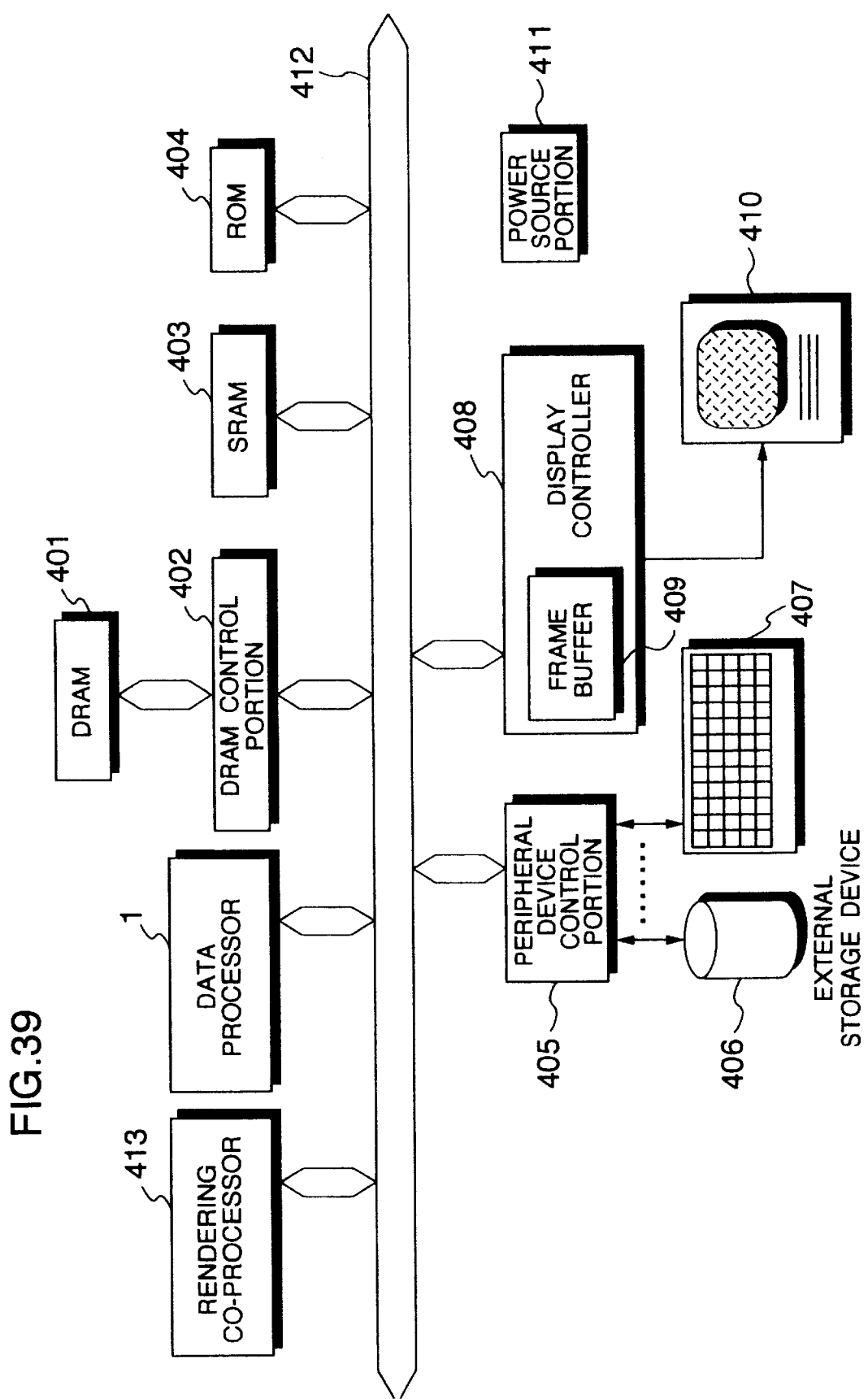
FIG. 39 is a block diagram showing one example of a three-dimensional graphics processing system, to which the data processor is applied.

FIG. 39 is a three-dimensional graphics processing system, in which a rendering co-processor 413 is added to the data processing system of FIG. 38. The three-dimensional graphic process is consisted of a geometry processing and rendering processing. Since the data processor 1 can process the inner product operation, the vector transforming operation or the like, which is frequently used particularly in geometry process, at high speed, high accuracy and high speed three-dimensional graphics process can be performed by adding the rendering co-processor 413 to the data processing system shown in FIG. 38. Needless to say, it is possible to construct the three-dimensional processing system even by making CPU in the data processor 1 to perform the rendering process instead of providing the rendering processor 413, in the three-dimensional graphics process of FIG. 39.

While the embodiments of the present invention made by the inventor has been specifically discussed hereinabove, the present invention should not be limited to the specific embodiments. Of course, various modifications are possible as long as not departing from the principle of the invention.

For example, while it is not discussed in FIG. 1, the data processor may include other functional block, such as memory management or so forth. Also, the data processor may employ a super scalar architecture. For example, in case where two pipes are provided, the vector transforming operation command is executed by one pipe, and loading of the vector data necessary for the vector transforming operation command from the memory to the register file or storing of the result of the vector transforming operation from the register file to the memory can be done by the other pipe.

Also, number of parallel arranged multiplier can be more than or equal to four. Furthermore, the construction of the exponent processing portion and the sign processing portion and the construction of the four input adder are not limited to the foregoing construction and can be modified arbitrarily.

Also, application of the data processor of the present invention is not limited to control of the game machine, the handheld PC or so forth, and the data processor can be widely applied for built-in control of various equipment's.

The effect to be attained by the typical one of the inventions disclosed in the present invention will be discussed as follow.

Namely, the data processor can realize speeding up of the inner product operation, the vector transforming operation in floating point.

Since the data processor is required to provide one circuit for normalization or so forth, it becomes possible to realize speeding up of inner product operation or vector transforming operation of floating point with restricting increasing of the circuit scale as least as possible.

In the vector transforming operation command, command specification to use both of the front-bank and the back-bank is employed to assure high speed execution of the vector transforming operation command even under constraint of resource of number of bits and number of register in the floating point command.

On the other hand, in execution of the vector transforming operation command, a series of four times of inner product calculation process controls latency of each inner product process so that the register write in the leading inner product calculation process is executed after register read in the last inner product calculation process. Therefore, even when the source register and the destination register is common register, the vector data to be the object for arithmetic operation may not be lost unwantedly. By this, number of occurrence of loading of the objective data for arithmetic operation for the floating point register and storing operation of the resultant data of arithmetic operation can be reduced to be useful for speeding up of the vector transforming operation under limited number of registers.

On the other hand, by adding the coefficient table or the feedback circuit of the multiplier to the arithmetic portion, the approximated value of trigonometric function is derived by zone division and high-order polynomial expansion. Thus, sine and cosine to be used for transformation matrix or so forth can be obtained without significantly increasing the chip area.

The data processor can execute inner product operation, the vector transforming operation or so forth of floating point which is frequently used for three-dimensional graphics process, can be executed at high speed under the resource of limited number of bits of floating point command and number of registers. The data processing system applied the data processor, can restrict the cost of the system with executing three-dimensional graphics process at high accuracy and high speed. Accordingly, the data processing system superior in a game machine, handheld PC or so forth which has severe constraint in the cost and not ignoble demand for higher performance and higher speed.

What is claimed is:

1. A data processor comprising:

a central processing unit; and a floating point unit, wherein said central processing unit and said floating point unit execute instructions in an instruction set, and wherein said instruction set includes a command for causing an inner product operation of a vector to be executed by said floating point unit.

2. A data processor according to claim 1, wherein said floating point unit comprises:

a plurality of multipliers for multiplying a mantissa part of a floating point number;

an aligner for receiving an output of said multipliers and carrying out an alignment shift on said output;

an exponent processing portion for generating an exponent prior to a normalization in accordance with an exponent part of said floating point number;

a multi-input adder for adding an output of said aligner; and a normalizing unit for normalizing an output of said multi-input adder and the exponent prior to the normalization.

3. A data processing system comprising:

means for executing a three-dimensional graphic processing using said a data processor, wherein said data processor comprises:

a central processing unit, and a floating point unit, wherein said central processing unit and said floating point unit execute instructions in an instruction set, and wherein said instruction set includes a command for causing an inner product operation of a vector to be executed by said floating point unit.

4. A data processor comprising:

a central processing unit; and a floating point unit, wherein said central processing unit and said floating point unit executes instructions in an instruction set, and wherein said instruction set includes a command for causing an inner product operation of a four-component vector and another four-component vector to be executed by said floating point unit.

5. A data processor according to claim 4, wherein said command includes a single instruction for executing the inner product operation.

6. A data processor system comprising:

means for executing a three-dimensional graphic processing using a data processor, wherein said data processor comprises:

a central processing, and a floating point unit, wherein said central processing unit and said floating point unit execute instructions in an instruction set, and wherein said instruction set includes a command for causing an inner product operation of a four-component vector and another four-component vector to be executed by said floating point unit.

7. A data processor comprising:

a central processing unit; and a floating point unit, wherein said central processing and said floating point unit execute instructions in an instruction set, and wherein said instruction set includes a command having a single instruction for causing an inner product operation of a vector to be executed by said floating point unit.

8. a data processor according to claim 7, wherein said floating point unit comprises:

a plurality of multipliers for multiplying a mantissa part of a floating point number;

an aligner for receiving an output of said multiplier, and carrying out an alignment shift;

an exponent processor portion for generating an exponent prior to a normalization in accordance with an exponent part of said floating point number;

a multi-input adder for adding an output of said aligner; and a normalizing unit for normalizing an output of said multi-input adder and the exponent prior to the normalization.

9. A data processing system comprising:

means for executing a three-dimensional graphic processing using a data processor, wherein said data processor comprises:

a central processing unit, and a floating point unit, wherein said central processing unit and said floating point unit execute instructions in an instruction set, and wherein said instruction set includes a command having a single instruction for causing an inner product operation of a vector to be executed by said floating point unit.

* * * * *